(12) United States Patent
Iwasaki et al.

(10) Patent No.: US 11,312,794 B2
(45) Date of Patent: Apr. 26, 2022

(54) PROTECTIVE FILM, OPTICAL FILM, LAMINATE, POLARIZING PLATE, IMAGE DISPLAY DEVICE AND METHOD FOR PRODUCING POLARIZING PLATE

(71) Applicant: Dai Nippon Printing Co., Ltd., Tokyo (JP)

(72) Inventors: Toshiki Iwasaki, Tokyo (JP); Kazuya Honda, Tokyo (JP); Yukimitsu Iwata, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 311 days.

(21) Appl. No.: 16/091,249

(22) PCT Filed: Mar. 31, 2017

(86) PCT No.: PCT/JP2017/013557
§ 371 (c)(1),
(2) Date: Mar. 4, 2019

(87) PCT Pub. No.: WO2017/175674
PCT Pub. Date: Oct. 12, 2017

(65) Prior Publication Data
US 2019/0196075 A1 Jun. 27, 2019

(30) Foreign Application Priority Data

Apr. 7, 2016 (JP) .............................. JP2016-077044
Apr. 7, 2016 (JP) .............................. JP2016-077045

(51) Int. Cl.
*C08F 2/48* (2006.01)
*G02B 5/30* (2006.01)
(Continued)

(52) U.S. Cl.
CPC ................. *C08F 2/48* (2013.01); *G02B 1/14* (2015.01); *G02B 5/30* (2013.01); *G02B 5/3075* (2013.01);
(Continued)

(58) Field of Classification Search
None
See application file for complete search history.

(56) References Cited

U.S. PATENT DOCUMENTS

2006/0246232 A1* 11/2006 Kubo ................ G02F 1/134363
428/1.31
2010/0182690 A1 7/2010 Takao et al.
(Continued)

FOREIGN PATENT DOCUMENTS

JP 2002-328223 A 11/2002
JP 2005-189623 A 7/2005
(Continued)

OTHER PUBLICATIONS

Translation of JP2014130298 (Year: 2014).*
(Continued)

*Primary Examiner* — Phu Vu
(74) *Attorney, Agent, or Firm* — Burr & Brown, PLLC

(57) ABSTRACT

According to one aspect of the present invention, a base material-less protective film used in a polarizing plate is provided, wherein the protective film comprises a core layer containing a resin made of a cured product, and an adhesion-improving layer provided on one surface of the core layer, and wherein a surface of the adhesion-improving layer forms one surface of the protective film, and the thickness of the protective film is less than 40 μm, and the tensile break strength of the protective film is 30 N/mm$^2$ or more.

20 Claims, 12 Drawing Sheets

(51) Int. Cl.
- *G02B 1/14* (2015.01)
- *G02F 1/1335* (2006.01)
- *C08F 220/28* (2006.01)
- *C08F 222/10* (2006.01)

(52) U.S. Cl.
CPC .... *G02F 1/133528* (2013.01); *C08F 220/286* (2020.02); *C08F 222/1025* (2020.02); *C08F 222/1061* (2020.02); *G02F 2201/50* (2013.01); *G02F 2202/28* (2013.01)

(56) References Cited

U.S. PATENT DOCUMENTS

| | | | | |
|---|---|---|---|---|
| 2011/0043733 | A1* | 2/2011 | Suzuki | G02F 1/133528 349/96 |
| 2016/0152861 | A1* | 6/2016 | Matsuo | C03C 17/30 428/447 |
| 2016/0377778 | A1* | 12/2016 | Kunai | G02B 5/305 359/487.02 |
| 2017/0183463 | A1* | 6/2017 | Nakahara | C08L 33/10 |

FOREIGN PATENT DOCUMENTS

| | | |
|---|---|---|
| JP | 2006-163082 | 6/2006 |
| JP | 2006-268065 A | 10/2006 |
| JP | 2006-337491 A | 12/2006 |
| JP | 2008-282020 | 11/2008 |
| JP | 2012-063773 | 3/2012 |
| JP | 2013-019996 | 1/2013 |
| JP | 2013-105134 | 5/2013 |
| JP | 2014-130298 | 7/2014 |
| JP | 2016-030331 | 3/2016 |
| JP | 2016071274 A * | 5/2016 |
| JP | 6323477 B2 * | 5/2018 |
| WO | 2009/016876 | 2/2009 |
| WO | 2009/145150 | 12/2009 |

OTHER PUBLICATIONS

Translation of JP-2016071274-A (Year: 2016).*
Translation of JP-6323477-B2 (Year: 2018).*
Japanese Office Action (Application No. 2018-510575) dated Apr. 21, 2020 (with English translation).
Chinese Office Action (Application No. 201780034668.X) dated Jun. 30, 2020 (with English translation).
International Preliminary Report on Patentability (Chapter I) from a corresponding international patent application (PCT/JP2017/013557) dated Oct. 9, 2018, 13 pages.
Japanese Office Action (Application No. 2018-510575) dated Jan. 5, 2021 (with English translation).

* cited by examiner

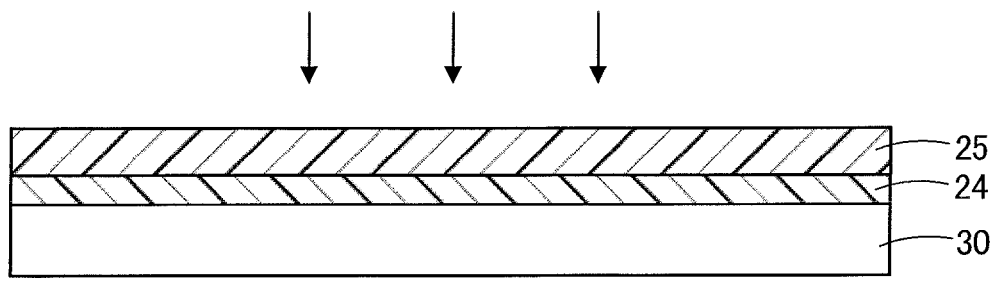
FIG.3A
FIG.3B
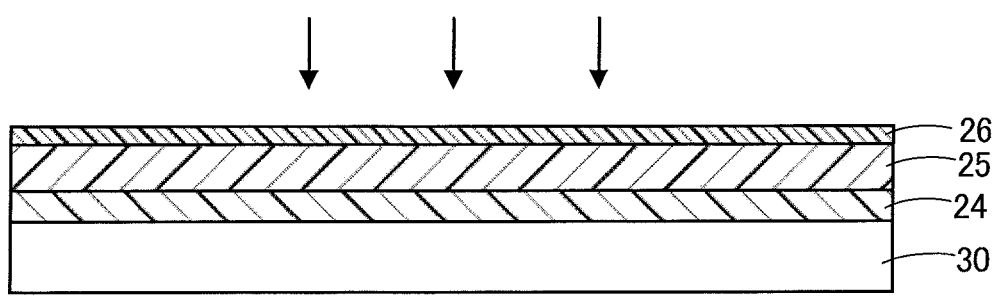
FIG.3C

PROTECTIVE FILM, OPTICAL FILM, LAMINATE, POLARIZING PLATE, IMAGE DISPLAY DEVICE AND METHOD FOR PRODUCING POLARIZING PLATE

CROSS-REFERENCE TO RELATED APPLICATION

The present application enjoys the benefit of priority to the prior Japanese Patent Application Nos. 2016-77044 (filed on Apr. 7, 2016) and 2016-77045 (filed on Apr. 7, 2016), the entire disclosures of which are incorporated herein by reference.

TECHNICAL FIELD

The present invention relates to a protective film, an optical film, a laminate, a polarizing plate, an image display device, and a method of producing the same polarizing plate.

BACKGROUND ART

In recent years, flat panel displays utilizing liquid crystalline or organic light-emitting diode technologies, particularly mobile devices called smartphone or tablet computer, are being developed. In such image display devices as mobile devices, a polarizing plate is usually placed on the observer's side of a display element.

A polarizing plate is composed of a polarizer and protective films provided on both surfaces of the polarizer, in which triacetylcellulose base materials (TAC base materials) are usually used as the protective films. The polarizer and the TAC base materials are often bonded together through an aqueous adhesive such as a polyvinyl alcohol adhesive (see, for example, Japanese Patent Application No. 2013-19996).

SUMMARY OF THE INVENTION

Recent development of flat panel displays requires polarizing plates to be thinner. However, TAC base materials used in polarizing plates as protective films are thick and also usually contain additives to achieve desired functions. Thus, a reduction in the thickness of the TAC base materials simply makes it difficult to obtain the desired functions. In a specific example, mobile devices are often used outdoors and polarizers inside the mobile devices are thus easily degraded by exposure to ultraviolet light, so that the TAC base materials usually contain ultraviolet absorbers. However, a reduction in the thickness of the TAC base materials simply makes it difficult to obtain ultraviolet-absorbing effects.

Accordingly, use of a core layer, instead of base materials such as TAC base materials, is currently studied, wherein the core layer contains a cured product and may be thinner than the base materials and can achieve desired functions when appropriate additives are added. In a specific example, use of a core layer containing a binder resin made of a cured product, and an ultraviolet absorber, and capable of having desired ultraviolet-absorbing effects is studied.

However, use of a core layer, instead of base materials, reduces adhesion to an aqueous adhesive used for bonding to a polarizer, which results in poor bonding of the core layer to the polarizer. Additionally, a protective film comprising such a core layer is currently required to have excellent toughness to inhibit cracks from occurring in the core layer when it is bonded to a polarizer.

Moreover, use of a core layer containing an ultraviolet absorber, instead of use of base materials, leads to a problem of deposition (bleed out) of the ultraviolet absorber on the surface of the core layer, which results in reduced adhesion to an adhesive and/or reduced transparency of the resulting optical film itself. Additionally, an optical film comprising such a core layer containing an ultraviolet absorber is also currently required to have excellent toughness to inhibit cracks from occurring in the core layer when it is bonded to a polarizer.

The present invention is designed to solve the above problems. In other words, an object of the present invention is to provide a protective film which has good adhesion to an adhesive and has excellent toughness, and a laminate, a polarizing plate and an image display device comprising the same protective film. Additionally, another object of the present invention is to provide a method of producing the polarizing plate having good adhesion of the protective film to the adhesive. In addition, still another object of the present invention is to provide an optical film which is capable of inhibiting deposition of an ultraviolet absorber and has excellent toughness, and a laminate, a polarizing plate and an image display device comprising the same optical film. Moreover, a further object of the present invention is to provide a method of producing the polarizing plate having good adhesion of the optical film to the adhesive.

According to one aspect of the present invention, a base material-less protective film used in a polarizing plate is provided, wherein the protective film comprises a core layer containing a resin made of a cured product, and an adhesion-improving layer provided on one surface of the core layer; and wherein a surface of the adhesion-improving layer forms one surface of the protective film, and the thickness of the protective film is less than 40 μm, and the tensile break strength of the protective film is 30 N/mm$^2$ or more.

In the above protective film, the contact angle of water on the surface of the adhesion-improving layer after saponification may be 80° or less.

In the above protective film, the adhesion-improving layer may be a cured product of a curable composition that contains an ionizing radiation-polymerizable compound and a silane coupling agent having a reactive functional group and a hydrolyzable group(s).

In the above protective film, the ionizing radiation-polymerizable compound may be a polyfunctional ionizing radiation-polymerizable compound.

In the above protective film, the reactive functional group may be an ionizing radiation-polymerizable functional group.

The above protective film may further comprise a light-transmitting functional layer provided on the other surface of the core layer, which is opposite to the one surface of the core layer.

According to another aspect of the present invention, a laminate comprising the above protective film and a mold release film provided on the other surface of the protective film, which is opposite to the one surface of the protective film, is provided.

According to another aspect of the present invention, a polarizing plate comprising the above protective film and a polarizer bonded to the adhesion-improving layer of the protective film through an adhesive layer is provided.

According to another aspect of the present invention, an image display device comprising a display panel is provided, wherein the display panel comprises a display element and the above protective film or polarizing plate placed on the observer's side of the display element.

According to another aspect of the present invention, a method of producing the polarizing plate is provided, wherein the method comprises the steps of:
bonding together the above laminate and a polarizer through an adhesive, such that the adhesive is in contact with the adhesion-improving layer of the laminate; and peeling off the mold release film from the laminate after bonding of the laminate to the polarizer.

The above method of producing the polarizing plate may further comprise the step of saponifying the laminate before bonding of the laminate to the polarizer.

Another aspect of the present invention may be a base material-less optical film, wherein the optical film comprises a core layer containing a binder resin made of a cured product and an ultraviolet absorber dispersed in the binder resin, and a deposition-inhibiting layer provided on one surface of the core layer and inhibiting deposition of the ultraviolet absorber; and wherein the thickness of the optical film is less than 40 μm, and the tensile break strength of the optical film is 30 N/mm² or more.

In the above optical film, the deposition-inhibiting layer may contain a resin made of a cured product of a polyfunctional ionizing radiation-polymerizable compound.

In the above optical film, the deposition-inhibiting layer may further contain a silane coupling agent.

The above optical film may further comprise a light-transmitting functional layer provided on the other surface of the core layer.

According to another aspect of the present invention, a laminate comprising the above optical film and a mold release film provided on a surface of the optical film opposite to the surface on the side of the deposition-inhibiting layer is provided.

According to another aspect of the present invention, a polarizing plate comprising the above optical film and a polarizer bonded to the deposition-inhibiting layer of the optical film through an adhesive is provided.

According to another aspect of the present invention, an image display device comprising a display panel is provided, wherein the display panel comprises a display element and the above optical film or polarizing plate placed on the observer's side of the display element.

According to another aspect of the present invention, a method of producing the polarizing plate is provided, wherein the method comprises the steps of:
bonding together the above laminate and a polarizer through an adhesive, such that the adhesive is in contact with the deposition-inhibiting layer of the laminate; and peeling off the mold release film after bonding of the laminate to the polarizer.

The above method of producing the polarizing plate may further comprise the step of saponifying the laminate before bonding of the laminate to the polarizer.

Advantageous Effects of the Invention

According to one aspect of the present invention, a protective film that comprises an adhesion-improving layer and thus adheres well to an adhesive and has excellent toughness can be provided. According to another aspect of the present invention, a laminate, a polarizing plate and an image display device comprising such a protective film can be provided. According to still another aspect of the present invention, a method of producing the polarizing plate having good adhesion of the protective film to the adhesive and having excellent toughness can be provided.

According to another aspect of the present invention, an optical film which is capable of inhibiting deposition of an ultraviolet absorber and has excellent toughness can be provided. According to still another aspect of the present invention, a laminate, a polarizing plate and an image display device comprising such an optical film can be provided. According to yet still another aspect of the present invention, a method of producing the polarizing plate having good adhesion of the optical film to the adhesive can be provided.

BRIEF DESCRIPTION OF THE DRAWINGS

FIGS. 3(A) to 3(C) schematically show the production process of the laminate according to the first embodiment.

DETAILED DESCRIPTION OF THE INVENTION

First Embodiment

Figure 1:
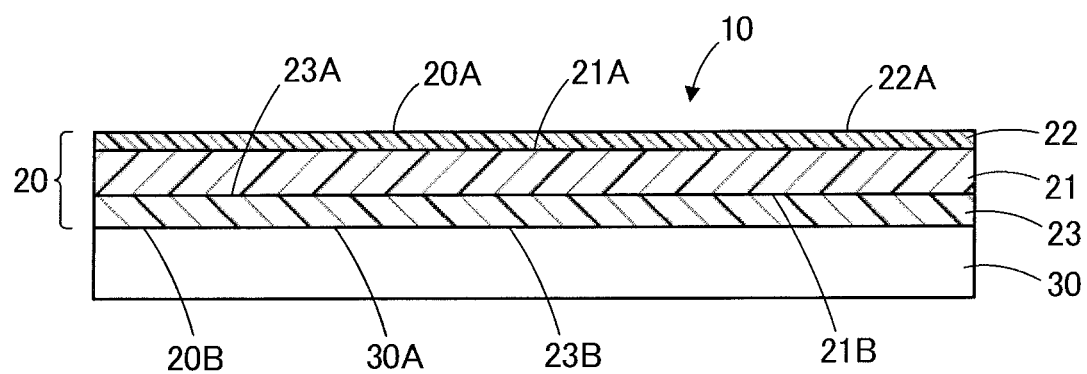
FIG. 1 depicts the schematic diagram of a laminate according to the first embodiment.

A protective film, a laminate, a polarizing plate and an image display device according to the first embodiment of the present invention are now described with reference to the drawings. In this specification, the terms "film" and "sheet" are not distinguished from each other on the basis of the difference of names alone. For example, the term "film" is thus used to refer inclusively to a member called "sheet". In addition, the term "light transmitting property" as used herein refers to a property that allows light transmission, including, for example, a total light transmittance of 50% or more, preferably 70% or more, more preferably 80% or more, and particularly preferably 90% or more. The term "light transmitting property" does not necessarily refer to transparency but may refer to translucency. FIG. 1 depicts the schematic diagram of the protective film according to the present embodiment, and FIGS. 2(A) to 2(C) and FIGS. 3(A) to 3(C) schematically show the production process of the protective film according to the present embodiment.

<<<Protective Film and Laminate>>>

A laminate 10 shown in FIG. 1 comprises a protective film 20 and a mold release film 30 laminated to the protective film 20.

<<Protective Film>>

The protective film 20 is a protective film comprising no base materials, that is, a base material-less protective film. The term "base material" as used herein refers to a film or sheet made of a thermoplastic resin or glass which serves as a support for production of the protective film. Examples of the base material include cellulose acylate base materials, such as triacetylcellulose base material; cycloolefin polymer base materials; polycarbonate base materials; acryl base materials; polyester base materials, such as polyethylene terephthalate base material; and glass base materials. The mold release film 30 is finally peeled off from the protective film 20 and thus is not a part of the protective film 20.

The protective film 20 comprises a core layer 21 and an adhesion-improving layer 22 provided on one surface 21A of the core layer 21. The protective film 20 may further comprise a light-transmitting functional layer 23 provided on the other surface 21B of the core layer 21.

The thickness of the protective film 20 is less than 40 μm from the viewpoint of reducing the thickness of the protective film 20. A cross-section of the protective film 20 is photographed using a scanning electron microscope (SEM) and the thickness of the protective film 20 is measured at 20 different locations within the image of the cross-section, and the average of the 20 thickness values is determined as the thickness of the protective film 20. The thickness of the protective film 20 is preferably less than 21 μm, more preferably less than 15 μm, and most preferably less than 10 μm, from the viewpoint of reducing the thickness of the protective film 20.

The protective film 20 shown in FIG. 1 is a three-layer structure composed of the light-transmitting functional layer 23, the core layer 21 and the adhesion-improving layer 22, and interfaces between the layers may not necessarily be clear. In cases where the interfaces between the layers are not clear, the identities of the light-transmitting functional layer, the core layer and the adhesion-improving layer can be determined by analyzing the components of the respective layers.

The tensile break strength of the protective film 20 is 30 N/mm$^2$ or more. The tensile break strength of the protective film 20 is measured, in accordance with JIS K7161-1: 2014, using a Tensilon universal tester to pull a strip of the protective film with a width of 25 mm and a distance between chucks of 80 mm at a test speed of 300 mm/min. The tensile break strength is determined as the maximum stress applied to the protective film when the protective film breaks. The arithmetic mean of three measurements is determined as the tensile break strength. The tensile break strength should be measured on the protective film 20 with the mold release film 30 peeled off. The tensile break strength of the protective film 20 is preferably 40 N/mm$^2$ or more.

The water vapor permeability of the protective film 20 is preferably 100 g/(m$^2$·24 h) or more and 600 g/(m$^2$·24 h) or less. In cases where the water vapor permeability of the protective film is less than 100 g/(m$^2$·24 h), the protective film allows very little moisture to pass through and wrinkles are thus easily produced, when an aqueous adhesive is applied. In cases where the water vapor permeability of the protective film is more than 600 g/(m$^2$·24 h), the moisture may cause deterioration of an organic light-emitting diode when the organic light-emitting diode is used as a display element. The term "water vapor permeability" as used herein refers to the amount of water vapor passing through the protective film for 24 hours (g/(m$^2$·24 h)), which is measured under an atmosphere at a temperature of 40° C. and a relative humidity of 90% in accordance with the testing method for water vapor transmission rate (cup method) described in JIS Z0208: 1976. The arithmetic mean of three measurements is determined as the water vapor permeability. The water vapor permeability should be measured on the protective film 20 with the mold release film 30 peeled off. More preferably, the lower limit of the water vapor permeability of the protective film 20 is 200 g/(m$^2$·24 h) or more and the upper limit is 500 g/(m$^2$·24 h) or less.

The protective film 20 preferably shows 7% or less of light transmittance at a wavelength of 380 nm. By limiting the light transmittance of the protective film 20 in this wavelength range of light to a value of 7% or less, the protective film 20 used in a mobile device such as smartphone or tablet terminal can inhibit degradation of its polarizer due to exposure to ultraviolet light. The uppermost light transmittance of the protective film is more preferably 5% at a wavelength of 380 nm. The light transmittance can be measured using a spectrophotometer (product name "UV-2450"; manufactured by Shimadzu Corporation). The arithmetic mean of three measurements is determined as the above transmittance.

The protective film 20 preferably has a haze value (total haze value) of less than 1%. By limiting the haze value of the protective film 20 to a value of less than 1%, the protective film 20 used in a mobile device can inhibit its display screen from turning white. The upper limit of the haze value of the protective film 20 is more preferably less than 0.5%, further preferably 0.4% or less, further preferably 0.3% or less, and most preferably 0.2% or less. The haze value as used herein refers to the haze value of the protective film 20 obtained before the moist heat resistance test described below, but the haze value of the protective film 20 obtained after the moist heat resistance test is also preferably less than 1%. The haze value of the protective film 20 obtained after the moist heat resistance test is more preferably less than 0.5%, and most preferably 0.3% or less. The haze values can be determined using a haze meter (product name "HM-150"; manufactured by Murakami Color Research Laboratory Co., Ltd.) in accordance with JIS K7136: 2000. The arithmetic mean of three measurements is determined as the haze value. The light transmittance and haze value of the protective film 20 can be achieved, for example, by adjusting the amount of an added ultraviolet absorber in, for example, the core layer 21.

The protective film 20 can be cut into a desired size or may be rolled. In cases where the protective film 20 is cut into a desired size, the protective film is not limited to a particular size, and the size of the film is appropriately determined depending on the display size of an image display device such as, for example, smartphone, tablet terminal, personal computer (PC), wearable terminal, digital signage, or television. Specifically, the protective film 20 may be, for example, 1 inch or more and 500 inch or less in size.

<<Core Layer>>

The core layer 21 is a layer containing a resin made of a cured product. If a resin formed by drying a solvent, such as a thermoplastic resin, is used instead of the above type of resin to form a core layer, the resulting core layer is too soft, which causes the resulting protective film to reduce pencil hardness. Thus, a resin made of a cured product is used as a resin to form the core layer 21.

The core layer 21 can be a layer made of the above-described resin alone or may contain additives to achieve desired functions. The additives are not limited to particular additives. A preferred additive is an ultraviolet absorber (UVA) which absorbs ultraviolet light to inhibit degradation of polarizer caused by ultraviolet light, because mobile devices are often used outdoors and polarizers inside the mobile devices are thus easily degraded by exposure to ultraviolet light. Additionally, the core layer 21 may contain, for example, inorganic particles such as silica particles, talc, or organic fibers as an additive to increase dimension stability and/or break strength. Cellulose nanofibers can be preferably used as the organic fibers. In cases where the core layer 21 contains additives such as an ultraviolet absorber, the resin functions as a binder resin.

The film thickness of the core layer 21 is preferably 5 μm or more and 40 μm or less. By limiting the film thickness of the core layer 21 to a value within the above range, the strength of the core layer 21 can be inhibited from drastically decreasing, as well as coating can be easily performed using a curable composition to form the core layer 21 (hereinafter, this composition is referred to as "core layer composition") and, furthermore, deterioration of processing properties (particularly, resistance to chipping) of the core layer 21 due to too large thickness is inhibited from occurring. The film thickness of the core layer 21 can be determined by observing a cross-section of the core layer under a scanning electron microscope (SEM). Specifically, scanning electron microscope images are used to measure the film thickness of the core layer 21 at three different locations per one image, and to repeat this measurement for five images, and the average of the measured film thickness values is calculated. The upper limit of the film thickness of the core layer 21 is more preferably 30 μm or less, further preferably 20 μm or less, and most preferably 10 μm or less.

<Resin>

The resin contained in the core layer 21 is a resin made of a cured product, as described above. Among such resins, a resin made of a cured product (polymerization product) of an ionizing radiation-polymerizable compound is preferred. The ionizing radiation-polymerizable compound is a compound having one or more ionizing radiation-polymerizable functional groups which can undergo ionizing radiation-induced polymerization. Examples of the ionizing radiation-polymerizable functional groups include ethylenic unsaturated groups such as (meth)acryloyl group, vinyl group, and allyl group. Both "acryloyl group" and "methacryloyl group" are meant by the word "(meth)acryloyl group". In addition, the types of ionizing radiation applied to induce polymerization of the ionizing radiation-polymerizable compound include visible light, ultraviolet light, X ray, electron beam, α ray, β ray, and γ ray.

In cases where a core layer with excellent toughness and a certain level of flexibility is obtained, for example, an ionizing radiation-polymerizable oligomer or prepolymer is preferably used as the ionizing radiation-polymerizable compound. Examples of the ionizing radiation-polymerizable oligomer or prepolymer include oligomers or prepolymers of urethane (meth)acrylate, polyester (meth)acrylate, epoxy (meth)acrylate, melamine (meth)acrylate, polyfluoroalkyl (meth)acrylate, silicone (meth)acrylate, and the like. These ionizing radiation-polymerizable oligomers or prepolymers may be used individually or in combination of two or more.

The weight average molecular weight of the ionizing radiation-polymerizable oligomer or prepolymer is preferably 1000 or more and 20000 or less. In this specification, the term "weight average molecular weight" refers to a molecular weight in terms of polystyrene obtained from the ionizing radiation-polymerizable oligomer or prepolymer dissolved in a solvent such as tetrahydrofuran (THF) by a conventionally known method of gel permeation chromatography (GPC). The lower limit of the weight average molecular weight of the ionizing radiation-polymerizable oligomer or prepolymer is more preferably 3000 or more, and the upper limit is more preferably 12000 or less, further preferably 10000 or less.

For the purpose of, for example, adjusting the hardness of the resin and/or the viscosity of the composition, the resin may be a cured product of a mixture containing, in addition to the ionizing radiation-polymerizable oligomer or prepolymer, an additional monofunctional ionizing radiation-polymerizable monomer.

The monofunctional ionizing radiation-polymerizable monomer is a compound having one or more ionizing radiation-polymerizable functional groups in the molecule. Examples of the monofunctional ionizing radiation-polymerizable monomer include hydroxyethyl acrylate (HEA), glycidyl methacrylate, methoxypolyethylene glycol (meth)acrylate, isostearyl (meth)acrylate, and 2-acryloyloxyethyl succinate.

<Ultraviolet Absorber>

The ultraviolet absorber has an ultraviolet absorbing function. The ultraviolet absorber is not limited to a particular ultraviolet absorber, and examples of the ultraviolet absorber include triazine-based ultraviolet absorbers, benzophenone-based ultraviolet absorbers, and benzotriazole-based ultraviolet absorbers.

Examples of the above-described triazine-based ultraviolet absorbers include 2-(2-hydroxy-4-[1-octyloxycarbonylethoxy]phenyl)-4,6-bis(4-phenylphenyl)-1,3,5-triazine, 2-[4-[(2-hydroxy-3-dodecyloxypropyl)oxy]-2-hydroxyphenyl]-4,6-bis(2,4-dimethylphenyl)-1,3,5-triazine, 2,4-bis[2-hydroxy-4-butoxyphenyl]-6-(2,4-dibutoxyphenyl)-1,3,5-triazine, 2-[4-[(2-hydroxy-3-tridecyloxypropyl)oxy]-2-hydroxyphenyl]-4,6-bis(2,4-dimethylphenyl)-1,3,5-triazine, and 2-[4-[(2-hydroxy-3-(2'-ethyl)hexyl)oxy]-2-hydroxyphenyl]-4,6-bis(2,4-dimethylphenyl)-1,3,5-triazine.

Additionally, examples of commercially available triazine-based ultraviolet absorbers include Tinuvin 460 (manufactured by BASF Japan Ltd.) and LA-46 (manufactured by ADEKA Corporation).

Examples of the above-described benzophenone-based ultraviolet absorbers include 2-hydroxybenzophenone, 2,4-dihydroxybenzophenone, 2,2'-dihydroxy-4,4'-dimethoxybenzophenone, 2,2',4,4'-tetrahydroxybenzophenone, 2-hydroxy-4-methoxybenzophenone, hydroxymethoxybenzophenone sulfonate and its trihydrate, and sodium hydroxymethoxybenzophenone sulfonate. Additionally, examples of commercially available benzophenone-based ultraviolet absorbers include CHMASSORB 81/FL (manufactured by BASF Japan Ltd.).

Examples of the above-described benzotriazole-based ultraviolet absorbers include 2-ethylhexyl-3-[3-tert-butyl-4-hydroxy-5-(5-chloro-2H-benzotriazol-2-yl) phenyl]propionate, 2-(2H-benzotriazol-2-yl)-6-(linear and branched dodecyl)-4-methylphenol, 2-[5-chloro (2H)-benzotriazol-2-yl]-4-methyl-6-(tert-butyl)phenol, 2-(2H-benzotriazol-2-yl)-4,6-di-tert-pentylphenol, 2-(2'-hydroxy-5'-methylphenyl) benzotriazole, 2-(2'-hydroxy-3',5'-di-tert-butylphenyl) benzotriazole, 2-(2'-hydroxy-3'-tert-butyl-5'-methyl phenyl) benzotriazole, 2-(2'-hydroxy-3',5'-di-tert-butylphenyl)-5-chlorobenzotriazole, 2-(2'-hydroxy-3'-(3",4",5",6"-tetrahydrophthalimidomethyl)-5'-methylphenyl)

benzotriazole, 2,2-methylenebis(4-(1,1,3,3-tetramethyl-butyl)-6-(2H-benzotriazokyl)phenol), and 2-(2'-hydroxy-3'-tert-butyl-5'-methylphenyl)-5-chlorobenzotriazole.

Additionally, examples of commercially available benzotriazole-based ultraviolet absorbers include KEMISORB 71D, KEMISORB 79 (both are manufactured by Chemipro Kasei Kaisha, Ltd.), .JF-80, JAST-500 (both are manufactured by Johoku Chemical Co., Ltd.), ULS-1933D (manufactured by Ipposha Oil Industries Co., Ltd.), and RUVA-93 (manufactured by Otsuka Chemical Co., Ltd.).

Among above-described ultraviolet absorbers, triazine-based ultraviolet absorbers are preferably used. Specifically, Tinuvin 400 (manufactured by BASF Japan Ltd.) is particularly preferably used from the viewpoints of ultraviolet absorbing ability and solubility in the above-described ionizing radiation-polymerizable monomer or oligomer, which is a component of the core layer 21.

The content of the above-described ultraviolet absorber is not limited to a particular amount but is preferably 1 part by mass or more and 6 parts by mass or less relative to 100 parts by mass of resin solids in the core layer composition. By limiting the content of the ultraviolet absorber in the core layer composition to a value within the above range, the resulting core layer can avoid remarkable coloring and significant strength reduction, as well as can contain a sufficient amount of the ultraviolet absorber. The lower limit of the content of the ultraviolet absorber is more preferably 2 parts by mass or more and the upper limit is more preferably 5 parts by mass or less.

The core layer 21 may contain a leveling agent. The core layer 21 may contain other components as necessary, such as, for example, a lubricant, a plasticizer, a bulking agent, a filler, an anti-static agent, an anti-blocking agent, a cross-linking agent, a photostabilizer, and a coloring agent such as dye or pigment.

<Leveling Agent>

The leveling agent refers to an additive that prevents defects generated due to an uneven surface tension created in the core layer, such as repelling, craters, pin holes, and orange peel, and smooths the surface. The leveling agent is not limited to a particular leveling agent, and examples of the leveling agent include compounds having a polyether group, polyurethane group, epoxy group, carboxyl group, acrylate group, methacrylate group, carbinol group, or hydroxyl group. The above-described leveling agent may have a polyether group(s), a polyurethane group(s), an epoxy group(s), a carboxyl group(s), an acrylate group(s), a methacrylate group(s), a carbinol group(s), or a hydroxyl group(s) at one or both ends of the main chain or in the side chain, or at one or both ends of the main chain and in the side chain. The leveling agent is not limited to a particular leveling agent as long as it is a compound having a polyether group, polyurethane group, epoxy group, carboxyl group, acrylate group, methacrylate group, carbinol group, or hydroxyl group. Examples of the leveling agent include silicone-based leveling agents, fluorine-based leveling agents, silicone/fluorine mixture-based leveling agents, acrylic leveling agents, methacrylic leveling agents, and aromatic leveling agents.

Leveling agents containing silicon atoms may reduce the recoatability of the core layer and also increase the number of coating defects such as repelling when a large amount of such a leveling agent is added to the core layer. Thus, fluorine-based leveling agents are preferred as the leveling agent. Examples of commercially available fluorine-based leveling agents include F-568, F-556, F-554, and F-553 (all are manufactured by DIC Corporation).

The content of the leveling agent is preferably 0.01 parts by mass or more and 5 parts by mass or less relative to 100 parts by mass of resin solids in the core layer composition. By limiting the content of the leveling agent to a value within the above range, the core layer 21 with a flatter surface can be obtained.

<<Adhesion-Improving Layer>>

The adhesion-improving layer 22 is a layer to enhance adhesion to an adhesive. In this specification, the term "adhesion-improving layer" should mean a layer which has a peel strength of 1 N or more when tested by the following method to determine the peel strength of the interface between the layer and the adhesive. Specifically, in cases where the base material-less protective film is not incorporated into a polarizing plate, on the one hand, the base material-less protective film after saponification is attached to one surface of a polarizer through a polyvinyl alcohol adhesive (an aqueous polyvinyl alcohol solution prepared by diluting a polyvinyl alcohol resin (product name "PVA-117"; manufactured by Kuraray Co., Ltd.) in pure water to a solid concentration of 5%) and a triacetylcellulose base material is also attached to the other surface of the polarizer, and the base material-less protective film is thus incorporated into a polarizing plate. Then, the surface of the resulting polarizing plate attached to the base material-less protective film is attached to a glass plate through a double-sided bonding tape "751B" manufactured by Teraoka Seisakusho Co., Ltd., such that the periphery of the polarizing plate is exposed from the glass plate. Then, the polarizing plate is clamped at an end exposed from the glass plate by a chuck and pulled at an angle of 180 degrees and a speed of 375 mm/min to measure the peel strength of the interface between the adhesive and the layer which is in contact with the adhesive in the base material-less protective film. The average of strength values obtained for stroke lengths (tensile lengths) from 100 mm to 200 mm is determined as the peel strength. In cases where the base material-less protective film is incorporated into a polarizing plate, on the other hand, the surface of the polarizing plate attached to the base material-less protective film is attached to a glass plate through a double-sided bonding tape "751B" manufactured by Teraoka Seisakusho Co., Ltd., such that the periphery of the polarizing plate is exposed from the glass plate. Then, the peel strength is measured by the same procedure as described above. In cases where a core layer is in contact with an adhesive in a base material-less protective film, the peel strength of the interface between the adhesive and the core layer is 100 mN or less. Thus, if a layer on a core layer is in contact with an adhesive and the peel strength between the above layer and the adhesive is 1 N or more, the above layer is considered to enhance adhesion to the adhesive. Therefore, the above layer is considered as an adhesion-improving layer.

The adhesion-improving layer 22 is not limited to a particular layer as long as it can enhance adhesion to an adhesive. However, in cases where the core layer 21 contains, for example, an ultraviolet absorber, deposition (bleed out) of the ultraviolet absorber on the surface of the core layer 21 may occur, which potentially increases the haze value of the resulting protective film. Thus, the adhesion-improving layer 22 may have an inhibitory function on deposition of an ultraviolet absorber, in addition to the adhesion enhancing function.

A surface 22A of the adhesion-improving layer 22 is coated with, for example, an aqueous adhesive described below. Thus, the contact angle of water on the surface 22A of the adhesion-improving layer 22 after saponification is preferably 80° or less. The saponification should be performed by immersing the protective film or the laminate in a 2 N sodium hydroxide aqueous solution at 55° C. for 3 minutes. The contact angle of water on the surface 22A of the adhesion-improving layer 22 can be measured using a microscopic contact angle meter (product name "CA-QI Series"; manufactured by Kyowa Interface Science Co., Ltd.) according to the sessile drop method described in JIS R3257-1999. The contact angle of water on the surface 22A of the adhesion-improving layer 22 is more preferably 70° or less.

The adhesion-improving layer 22 may have an inhibitory function on deposition of an ultraviolet absorber, as well as the function to enhance adhesion to an adhesive. It can be determined whether or not an adhesion-improving layer in a protective film has an inhibitory function on deposition of an ultraviolet absorber, by performing a moist heat resistance test on the protective film, in which the optical film is left for 24 hours in the environment at a temperature of 80° C. and a relative humidity of 90%, and determining whether or not the ratio of the haze value in the protective film after the moist heat resistance test to that before the moist heat resistance test is 10 or less. In other words, if the ratio of the haze value in the protective film after the moist heat resistance test to that before the moist heat resistance test is 10 or less when the adhesion-improving layer is placed on the core layer, the adhesion-improving layer would be determined to have additionally an inhibitory function on deposition of an ultraviolet absorber. The haze values can be determined using a haze meter (product name "HM-150"; manufactured by Murakami Color Research Laboratory Co., Ltd.) in accordance with JIS K7136: 2000. The arithmetic mean of three measurements is determined as the haze value. The ratio of the haze value in the protective film 20 obtained after the moist heat resistance test to that obtained before the moist heat resistance test is preferably 5 or less, and more preferably 3 or less.

The film thickness of the adhesion-improving layer 22 is preferably 100 nm or more and less than 800 nm. In cases where the film thickness of the adhesion-improving layer is less than 100 nm, adhesion to an adhesive may not be enhanced. In cases where the film thickness of the adhesion-improving layer is 800 nm or more, the adhesion-improving layer may suffer from high cure shrinkage and poor adhesion with the core layer. The film thickness of the adhesion-improving layer 22 can be measured by the same measurement method as for the film thickness of the core layer 21 as described above. The lower limit of the film thickness of the adhesion-improving layer 22 is more preferably 150 nm or more. The upper limit of the film thickness of the adhesion-improving layer 22 is more preferably 600 nm or less, and most preferably 500 nm or less.

The adhesion-improving layer 22 is preferably a cured product of a curable composition that contains an ionizing radiation-polymerizable compound and a silane coupling agent having a reactive functional group and a hydrolyzable group(s) (hereinafter, this composition is referred to as "adhesion-improving layer composition"), from the viewpoint of enhancing adhesion to an adhesive.

<Ionizing Radiation-Polymerizable Compound>

The ionizing radiation-polymerizable compound in the adhesion-improving layer composition may be a compound having one or more ionizing radiation-polymerizable functional groups in the molecule and is preferably a polyfunctional radiation-polymerizable compound having two or more ionizing radiation-polymerizable functional groups in the molecule. By using such a polyfunctional ionizing radiation-polymerizable compound, the adhesion-improving layer 22 can ensure adhesion to the core layer 21, as well as can improve scratching resistance. In addition, though an ultraviolet absorber added to the core layer has a tendency to migrate from the core layer to the adhesion-improving layer and to deposit on the surface of the adhesion-improving layer, use of a polyfunctional ionizing radiation-polymerizable compound in the adhesion-improving layer composition results in increased cross-linking density in the resulting adhesion-improving layer to successfully inhibit deposition of the ultraviolet absorber. The polyfunctional ionizing radiation-polymerizable compound preferably has two or more, more preferably three or more, ionizing radiation-polymerizable functional groups in the molecule.

The ionizing radiation-polymerizable compound in the adhesion-improving layer composition is not limited to a particular compound, and examples of the ionizing radiation-polymerizable compound include esters between polyhydric alcohols and (meth)acrylic acids, heterocyclic (meth)acrylates, urethane (meth)acrylate, polyester (meth)acrylate, epoxy (meth)acrylate, and combinations thereof.

<Silane Coupling Agent>

The silane coupling agent is an organosilicon compound having a reactive functional group and a hydrolyzable group(s). The reactive functional group is a group capable of reacting with, for example, the polyfunctional ionizing radiation-polymerizable compound, and the reactive functional group may be one or more selected from the group consisting of vinyl group, epoxy group, styryl group, (meth)acryloyl group, amino group, ureido group, thiol group, sulfide group, and isocyanate group. Among these groups, (meth)acryloyl group is preferred in terms of adhesion to the core layer 21.

The hydrolyzable group is a group capable of undergoing hydrolysis to produce a silanol group (Si—OH) and an alcohol, and examples of the hydrolyzable group include halogen atoms, alkoxy group, acyloxy group, alkenyloxy group, carbamoyl group, amino group, aminooxy group, and ketoxymate group. In cases where the hydrolyzable group is a carbon-containing hydrolyzable group, the number of carbon atoms is preferably 6 or less, and more preferably 4 or less. In particular, the hydrolyzable group is preferably an alkoxy or alkenyloxy group having 4 or less carbon atoms, and particularly preferably methoxy group or ethoxy group.

Specific examples of the silane coupling agent include [3-(methacryloyloxy)propyl]methyldimethoxysilane, [3-(methacryloyloxy)propyl]trimethoxysilane, [3-(methacryloyloxy)propyl]methyldiethoxysilane, [3-(methacryloyloxy)propyl]triethoxysilane, and [3-(acryloyloxy)propyl]triethoxysilane.

The content of the silane coupling agent is preferably 10 parts by mass or more and 50 parts by mass or less relative to 100 parts by mass of resin solids in the adhesion-improving layer composition. By limiting the content of the silane coupling agent to a value within the above range, adhesion to the adhesive can be further improved.

<<Light-Transmitting Functional Layer>>

The term "light-transmitting functional layer" as used herein refers to a layer having light-transmitting property and intended to achieve some functions in the protective film. Specific examples of the light-transmitting functional layer include layers exerting functions, such as hard coat properties or anti-reflection properties. The light-transmitting functional layer may be not only a monolayer structure but also a laminate composed of two or more layers. In cases where the light-transmitting functional layer is a laminate composed of two or more layers, the respective layers may have the same function or different functions. In this embodiment, the light-transmitting functional layer 23 as a layer with hard coat properties, namely a hard coat layer, is described.

The light-transmitting functional layer 23 functions as a hard coat layer, as described above, and the light-transmitting functional layer 23 is thus a layer with a hardness of "H" or higher on the pencil hardness test specified by JIS K5600-5-4: 1999. By limiting the pencil hardness to a hardness of "H" or higher, the resulting protective film 20 can have sufficient hardness and increase durability. The pencil hardness test is performed by applying a load of 750 g to a pencil and moving the pencil at a speed of 1 mm/sec to make a scratch. The grade of the hardest pencil that does not scratch the surface of the light-transmitting functional layer during the pencil hardness test is determined as the pencil hardness. A plural number of pencils with different hardness are used for the measurement of pencil hardness and the pencil hardness test is repeated five times on each pencil. In cases where no scratch is made on the surface of the optical film with a pencil with specific hardness in four or more out of the five replicates, the pencil with the hardness is determined to make no scratch on the surface of the light-transmitting functional layer. The above-described scratch refers to a scratch which is visibly detectable when the surface of a light-transmitting functional layer subjected to the pencil hardness test is observed under transmitting fluorescent light. The upper limit of the pencil hardness of the light-transmitting functional layer 23 is preferably around 4H in terms of the toughness of the light-transmitting functional layer and from the viewpoint of preventing curling.

The surface 23B of the light-transmitting functional layer 23 opposite the surface 23A attached to the core layer 21 (hereinafter, this surface is referred to as "the surface of the light-transmitting functional layer") is the other surface 20B of the protective film 20. 1 µm square (1 µm×1 µm) and 5 µm square (5 µm×5 µm) on the surface 23B of the light-transmitting functional layer 23 each preferably have an arithmetic mean roughness (Ra) of 0.5 nm or more and 1.5 nm or less, a maximum height (Rz) of 4 nm or more and 20 nm or less, and a maximum peak height (Rp) of 2 nm or more and 15 nm or less. The definitions of Ra, Rz and Rp should follow JIS B0601: 2001. The Ra, Rz, and Rp should be calculated, for example, using an atomic force microscope (product name "WET-9100"; manufactured by Shimadzu Corporation) as follows. Specifically, a 5 mm square is first cut at each of randomly selected three positions on the protective film where no abnormalities (large foreign materials and scratches) are found at least by visual inspection, to obtain three samples. Meanwhile, a plural number of flat and circular metal plates with a diameter of 15 mm and a thickness of 1 mm are prepared and each metal plate is attached with a piece of a double-sided carbon coated tape manufactured by Nissin EM Co., Ltd. Each sample is attached to each piece of the tape such that the surface of the sample (the surface of the protective film) faces upward. Then, the metal plates attached with the samples are left in a desiccator overnight to secure adhesion between the tape and the samples. After leaving overnight, each metal plate attached with a sample is fixed on the stage of an atomic force microscope (product name "WET-9400"; manufactured by Shimadzu Corporation), by means of a magnet, and the surface profiles of square measurement areas of 1 µm side and 5 µm side are observed in tapping mode under the atomic force microscope. Then, the Ra, Rz, and Rp are calculated from the observation data using the surface analysis software installed in the atomic force microscope. The vertical scale during the surface analysis is 20 nm. The observation is performed at room temperature and a cantilever NCHR-20 manufactured by NanoWorld AG is used as a cantilever. In the observation of surface profile, five positions are randomly selected from each of three samples and the surface profile is observed at the 15 positions in total. Then, the Ra, Rz, and Rp are calculated from all the obtained data of the 15 positions using the surface analysis software installed in the atomic force microscope, and the arithmetic means of the values from the 15 positions are considered as the Ra, Rz, and Rp of the respective samples.

The value of, for example, Ra in the surface 23B of the light-transmitting functional layer 23 is measured on areas of 1 µm square, rather than areas of 5 µm square, to achieve a higher resolution, while the value of, for example, Ra in the surface 23B of the light-transmitting functional layer 23 is measured on areas of 5 µm square, rather than areas of 1 µm square, to observe the surface profile in wider areas.

In addition, the surface 23B of the light-transmitting functional layer 23 is defined using the Ra, Rz, and Rp because of the following reasons. Ra is a parameter used to indicate the average distance between peaks and valleys on the surface of the light-transmitting functional layer, and Rz is a parameter used to indicate the sum of the maximum peak height and the maximum valley depth on the surface of the light-transmitting functional layer, and Rp is a parameter used to indicate the maximum peak height on the surface of the light-transmitting functional layer. Here, the value of Ra indicates the average distance between peaks and valleys on the surface of the light-transmitting functional layer and thus roughly indicates the surface profile of the light-transmitting functional layer. However, even if an exceptionally high peak or deep valley is present on the surface of the layer, the presence of the peak or valley is masked by the mean value and is potentially overlooked. Additionally, use of two parameters, namely Ra and Rp, in which the maximum peak height on the surface of the light-transmitting functional layer is indicated by the value of Rp, may cause overlooking the presence of exceptionally deep valley even if such a valley is present on the surface of the layer. Furthermore, use of two parameters, namely Ra and Rz, in which the sum of the maximum peak height and the maximum valley depth on the surface of the light-transmitting functional layer is indicated by the value of Rz, may cause failure to demonstrate which is present on the surface of the layer, an exceptionally high peak or an exceptionally deep valley. Thus, one parameter, namely Ra, or two parameters, namely Ra and Rp or Ra and Rz, are insufficient and three parameters, namely Ra, Rz and Rp, are required to determine whether or not a surface has a uniform and flat surface profile. Therefore, in this embodiment, the surface profile of the light-transmitting functional layer is defined using the three parameters, namely Ra, Rz and Rp.

In cases where areas of 1 µm square and 5 µm square on the surface of the light-transmitting functional layer each have a Ra of less than 0.5 nm, the resulting protective film has an extremely smooth surface and thus, when rolled up, the protective film may stick to itself. Additionally, in cases where the square areas each have a Ra of more than 1.5 nm, the contact angle of water on the surface of the layer is increased and the roughness of the surface may also increase the haze value to impair the transparency. Thus, areas of 1 µm square and 5 µm square on the surface 23B of the light-transmitting functional layer 23 each preferably have a Ra of 0.5 nm or more and 1.5 nm or less, as described above.

Areas of 1 μm square and 5 μm square on the surface 23B of the light-transmitting functional layer 23 each preferably have a Ra of 1.0 nm or less as a lower limit value.

In cases where areas of 1 μm square and 5 μm square on the surface of the light-transmitting functional layer each have a Rz of less than 4 nm, the resulting protective film has an extremely smooth surface and thus, when rolled up, the protective film may stick to itself. Additionally, in cases where the areas each have a Rz of more than 20 nm, the contact angle of water on the surface of the layer is increased and the roughness of the surface may also increase the haze value to impair the transparency. Thus, square areas of 1 μm square and 5 μm square on the surface 23B of the light-transmitting functional layer 23 each preferably have a Rz of 4 nm or less and 20 nm or more, as described above.

Areas of 1 μm square and 5 μm square on the surface 23B of the light-transmitting functional layer 23 each preferably have a Rz of 5 nm or more as a lower limit value and a Rz of 15 nm or less as an upper limit value.

In cases where areas of 1 μm square and 5 μm square on the surface of the light-transmitting functional layer each have a Rp of less than 2 nm, the resulting protective film has an extremely smooth surface and thus, when rolled up, the protective film may stick to itself. Additionally, in cases where the areas each have a Rp of more than 15 nm, the contact angle of water on the surface of the layer is increased and the roughness of the surface may also increase the haze value to impair the transparency. Thus, areas of 1 μm square and 5 μm square on the surface 23B of the light-transmitting functional layer 23 each preferably have a Rp of 2.0 nm or more and 15 nm or less, as described above.

Areas of 1 μm square and 5 μm square on the surface 23B of the light-transmitting functional layer 23 each preferably have a Rp of 3 nm or more as a lower limit value and a Rp of 10 nm or less as an upper limit value.

The light-transmitting functional layer 23, in which areas of 1 μm square and 5 μm square on the surface 23B each have an arithmetic mean roughness (Ra) of 0.5 nm or more and 1.5 nm or less, a maximum height (Rz) of 4 nm or more and 20 nm or less and a maximum peak height (Rp) of 2 nm or more and 15 nm or less, can be achieved by transferring the surface profile of the mold release film 30 to the surface 23B of the light-transmitting functional layer 23. In cases where the above particular surface profile is obtained by transferring the surface profile of the mold release film 30 to the surface 23B of the light-transmitting functional layer 23, no influence of additives contained in the light-transmitting functional layer 23 is exerted on formation of the surface profile and thus the production process is easy. For a conventional production method, for example, comprising applying and curing a light-transmitting functional layer composition on a light-transmitting base material, it is quite hard to reproduce the particular surface profile of the light-transmitting functional layer 23 as in this embodiment.

The film thickness of the light-transmitting functional layer 23 is preferably 2.0 or more μm and 15 μm or less. By limiting the film thickness to a value within the above range, the light-transmitting functional layer 23 can reduce the amount of residual solvent and also inhibit reduction in adhesiveness, as well as can achieve a desired hardness. The film thickness of the light-transmitting functional layer 23 can be measured by the same measurement method as for the film thickness of the core layer 21.

The lower limit of the film thickness of the light-transmitting functional layer 23 is more preferably less than 12 μm from the viewpoint of inhibiting cracks from occurring in the light-transmitting functional layer. Additionally, the film thickness of the light-transmitting functional layer 23 is further preferably 3 μm or more and less than 10 μm from the viewpoint of inhibiting curling while making the light-transmitting functional layer thinner.

The refractive index of the light-transmitting functional layer 23 may be 1.50 or more and 1.60 or less. The lower limit of the refractive index of the light-transmitting functional layer 23 may be 1.52 or more, while the upper limit of the refractive index of the light-transmitting functional layer 23 may be 1.56 or less.

The refractive index of the light-transmitting functional layer 23 can be measured with an Abbe refractometer (product name "NAR-4T"; manufactured by Atago Co., Ltd.) or an ellipsometer. Additionally, the refractive index of the light-transmitting functional layer 23 may be determined by scraping off a portion of the light-transmitting functional layer 23 with, for example, a cutter knife to prepare a powder sample and analyzing the resulting sample by the Becke Line method (in the method, reagents with known refractive indices from Cargille Labs are used; one of the reagents is dropped on the powder sample placed on, for example, a slide glass to immerse the sample with the reagent; the sample immersed with the reagent is observed by microscopy; the reagent is changed by another reagent to find a reagent that renders a bright line (Becke line) undetectable by naked eyes, which appears at the boundary of the sample due to the difference in refractive index between the sample and the reagent; the refractive index of such a reagent corresponds to the refractive index of the sample) according to the type B method (for transparent materials in powder or granular form) described in JIS K7142: 2008.

The light-transmitting functional layer 23 preferably contains a resin made of a cured product (polymerization product) of an ionizing radiation-polymerizable compound. The light-transmitting functional layer 23 may be a layer made of the resin alone or preferably contains inorganic particles, in addition to the resin, from the viewpoint of increasing the hardness of the light-transmitting functional layer. In cases where the light-transmitting functional layer 23 contains inorganic particles, the resin functions as a binder resin. Additionally, the light-transmitting functional layer 23 may contain a leveling agent.

<Resin>

The resin contained in the light-transmitting functional layer 23 is preferably a resin made of a cured product of an ionizing radiation-polymerizable compound, as described above. Examples of the ionizing radiation-polymerizable compound include ionizing radiation-polymerizable monomers, ionizing radiation-polymerizable oligomers, and ionizing radiation-polymerizable prepolymers; these compounds can be used as appropriate. A combination of an ionizing radiation-polymerizable monomer and an ionizing radiation-polymerizable oligomer or prepolymer is preferred as the ionizing radiation-polymerizable compound.

(Ionizing Radiation-Polymerizable Monomer)

As the ionizing radiation-polymerizable monomer, a polyfunctional ionizing monomer with two or more ionizing radiation-polymerizable functional groups (that is, a bifunctional monomer) is preferred. Examples of the ionizing radiation-polymerizable monomer include ionizing radiation-polymerizable monomers into which modifying groups involved in, for example, alkylene oxide modification, urethane modification, epoxy modification, or alkoxy modification have been introduced. Among those radiation-polymerizable monomers, alkylene oxide-modified (meth) acrylates are preferred from the viewpoint obtaining a protective film with a good ability to peel off from a mold release film, and also with tackiness and high mechanical strength. Examples of the alkylene oxide include methylene oxide, ethylene oxide, propylene oxide, and butylene oxide.

Among those ionizing radiation-polymerizable monomers, ethylene oxide-modified (EO-modified) acrylates and propylene oxide-modified (PO-modified) acrylates are more preferred from the viewpoint of obtaining a good detachability and high scratching resistance. Furthermore, PO-modified acrylate is particularly preferred because of its good balance between the detachability and the scratching resistance, among those ionizing radiation-polymerizable monomers.

(Ionizing Radiation-Polymerizable Oligomer)

Examples of the ionizing radiation-polymerizable oligomer include oligomers of, for example, urethane (meth) acrylate, polyester (meth)acrylate, epoxy (meth)acrylate, melamine (meth)acrylate, polyfluoroalkyl (meth)acrylate, and silicone (meth)acrylate.

(Ionizing Radiation-Polymerizable Prepolymer)

The ionizing radiation-polymerizable prepolymer preferably has a weight average molecular weight of 10000 or more and 80000 or less, and more preferably 10000 or more and 40000 or less. In cases where the ionizing radiation-polymerizable prepolymer has a weight average molecular weight of more than 80000, the ionizing radiation-polymerizable prepolymer has a high viscosity and thus reduces the suitability as a coating material, which may deteriorate the appearance of the resulting protective film. Examples of the ionizing radiation-polymerizable prepolymer include prepolymers of, for example, urethane (meth)acrylate, polyester (meth)acrylate, epoxy (meth)acrylate, melamine (meth)acrylate, polyfluoroalkyl (meth)acrylate, and silicone (meth)acrylate. Among those ionizing radiation-polymerizable prepolymers, urethane acrylate prepolymer is preferred from the viewpoint of enhancing adhesion to the core layer.

In a preferred combination of an ionizing radiation-polymerizable monomer and an ionizing radiation-polymerizable prepolymer, the ionizing radiation-polymerizable monomer is an EO-modified acrylate and the ionizing radiation-polymerizable prepolymer is a urethane acrylate prepolymer.

The ionizing radiation-polymerizable monomer and the ionizing radiation-polymerizable prepolymer are preferably contained in a ratio of 90:10 to 70:30. By the ionizing radiation-polymerizable monomer and the ionizing radiation-polymerizable prepolymer contained within the above range of ratio, the flexibility and the toughness can be improved without impairing the hardness.

<Inorganic Particles>

The inorganic particles are a component intended to increase the mechanical strength and pencil strength of the light-transmitting functional layer 23, and examples of the inorganic particles include inorganic oxide particles, such as silica ($SiO_2$) particles, alumina particles, titanic particles, tin oxide particles, antimony-doped tin oxide (abbreviation: ATO) particles, and zinc oxide particles. Among those particles, silica particles are preferred from the viewpoint of further increasing the hardness. Among those silica particles, deformed silica particles are more preferred. In cases where spherical silica particles are used, spherical silica particles with smaller particle diameters lead to higher hardness in the light-transmitting functional layer. On the other hand, deformed silica particles can achieve a hardness equivalent to that of commercially available spherical silica particles with the smallest particle diameter even if those deformed silica particles are not as small as those spherical silica particles.

The average primary particle diameter of the deformed silica particles is preferably 1 nm or more and 100 nm or less. Even if the average primary particle diameter is within the above range, the deformed silica particles can achieve a hardness equivalent to that of spherical silica particles with an average primary particle diameter of 1 nm or more and 45 nm or less. The average particle diameter of deformed silica particles is determined by randomly selecting 10 deformed silica particles within an image of a cross-section of the light-transmitting functional layer photographed at a magnification of 200000 times under a transmission electron microscope (TEM), measuring the particle diameters of the respective particles, and calculating the average of the particle diameters. The particle diameter of each deformed silica particle is intended to be the average of the shortest and the longest diameters in the cross-section of the particle.

The content of inorganic particles in the light-transmitting functional layer 23 is preferably 20% by mass or more and 70% by mass or less. In cases where the content of inorganic particles is less than 20% by mass, securing a sufficient hardness is challenging. Additionally, in cases where the content of inorganic particles is more than 70% by mass, the filling ratio is increased excessively and the adhesion between the inorganic particles and the resin components is thus reduced to conversely reduce the hardness of the light-transmitting functional layer.

As the inorganic particles, inorganic particles having reactive functional groups on the surface (reactive inorganic particles) are preferably used. Such inorganic particles having reactive functional groups on the surface can be produced by surface treatment of inorganic particles with, for example, a silane coupling agent. Examples of the method of treating the surface of inorganic particles with a silane coupling agent include a dry method in which the silane coupling agent is sprayed over the inorganic particles, and a wet method in which the inorganic particles are dispersed in a solvent and the silane coupling agent is then added to the solvent and allowed to react with the inorganic particles.

<Leveling Agent>

The leveling agent contained in the light-transmitting functional layer 23 is similar to the leveling agent described in the section on the core layer 21 and, thus, further description thereof is omitted here. The content of the leveling agent is preferably 0.01 parts by mass or more and 5 parts by mass or less relative to 100 parts by mass of resin solids in a curable composition for the production of the light-transmitting functional layer 23 (hereinafter, this composition is referred to as "composition for functional layer"). By limiting the content of the leveling agent to a value within the above range, the surface 23B of the light-transmitting functional layer 23 with a flatter surface can be obtained.

<<Mold Release Film>>

The mold release film 30 is a film which is peeled off from the protective film 20 to transfer the protective film 20 into a polarizing plate described below. The mold release film 30 can be a light-transmitting film or may be not a light-transmitting film because the mold release film 30 is peeled off after the protective film 20 is transferred into the polarizing plate.

The thickness of the mold release film 30 is not limited to a particular thickness but is preferably 25 µm or more and 100 µm or less. In cases where the thickness of the mold release film is less than 25 µm, an influence of cure shrinkage of the light-transmitting functional layer remarkably appears when the light-transmitting functional layer is cured as described below by ionizing radiation, which leads to easy formation of major wrinkles on the mold release film. Additionally, in cases where the thickness of the mold release film is more than 100 µm, the production cost is increased.

In cases of obtaining the light-transmitting functional layer 23 in which areas of 1 µm square (1 µm×1 µm) and 5 µm square (5 µm×5 µm) on the surface 23B each have an arithmetic mean roughness (Ra) of 0.5 nm or more and 1.5 nm or less, a maximum height (Rz) of 4 nm or more and 20 nm or less and a maximum peak height (Rp) of 2 nm or more and 15 nm or less, one surface 30A of the mold release film 30 preferably has areas of 1 µm square and 5 µm square each having an arithmetic mean roughness (Ra) of 0.5 nm or more and 1.5 nm or less, a maximum height (Rz) of 4 nm or more and 20 nm or less, and a maximum valley depth (Rv) of 2 nm or more and 15 nm or less. The definitions of Ra, Rz and Rv should follow JIS B0601: 2001. The Ra, Rz, and Rv should be calculated, for example, using an atomic force microscope (product name "WET-9100"; manufactured by Shimadzu Corporation) by the same procedure and under the same conditions as those for the calculation of the Ra, Rz, and Rp described in the section on the light-transmitting functional layer 23.

The mold release film 30 is not limited to a particular mold release film. As the mold release film, for example, a polyethylene terephthalate (PET) film with at least one untreated surface is preferably used. In this case, the untreated surface of the polyethylene terephthalate film is used as a release surface. The polyethylene terephthalate film with at least one untreated surface is inexpensive as well as has an excellent ability to peel off from the light-transmitting functional layer, and thus can save the production cost of the laminate according to this embodiment. For example, in cases where a mold release film coated with, for example, a Si-based mold release agent containing silicon atoms is used as the above-described mold release film, the mold release film has a good releasability but transfers components of the mold release agent to the light-transmitting functional layer during contact with the light-transmitting functional layer, which may increase the contact angle of water on the surface of the light-transmitting functional layer, as well as the surface roughness of the light-transmitting functional layer. On the other hand, in cases where a polyethylene terephthalate film with at least one untreated surface is used as the mold release film 30, the polyethylene terephthalate film transfers no components to the light-transmitting functional layer 23 during contact with the protective film 20, which keeps the surface of the light-transmitting functional layer smooth and also causes little change in the contact angle of water on the surface 23B of the light-transmitting functional layer 23 after the transfer. In this specification, the "polyethylene terephthalate film with at least one untreated surface" refers to a polyethylene terephthalate film with an untreated surface. Thus, a mold release agent designed to enhance releasability is not present on the untreated surface of the polyethylene terephthalate film with at least one untreated surface.

<<<Methods of Producing the Protective Film and the Laminate>>>

Figure 2A:
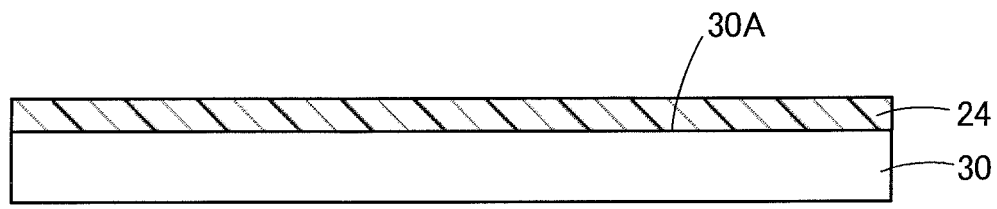
FIGS. 2(A) to 2(C) schematically show the production process of the laminate according to the first embodiment.

The laminate 10 and the protective film 20 can be produced, for example, as follows. First, a light-transmitting functional layer composition is applied and dried on one surface 30A of a mold release film 30 to produce a coating film 24 of the light-transmitting functional layer composition, as shown in FIG. 2(A).

The light-transmitting functional layer composition contains the ionizing radiation-polymerizable compound and may be additionally supplemented with the above-described inorganic particles, the above-described leveling agent, a solvent, and a polymerization initiator, as necessary. Furthermore, the light-transmitting functional layer composition may be supplemented with, for example, a conventionally known dispersing agent, surfactant, silane coupling agent, thickener, coloring inhibitor, coloring agent (pigment and dye), antifoam agent, flame retardant, ultraviolet absorber, adhesion promoter, polymerization inhibitor, antioxidant, surface modifier, and/or smoothing agent in accordance with various purposes of, for example, increasing hardness, reducing cure shrinkage, and/or controlling refractive index in the light-transmitting functional layer.

<Solvent>

Examples of the solvent include alcohols (such as methanol, ethanol, propanol, isopropanol, n-butanol, s-butanol, t-butanol, benzyl alcohol, PGME, and ethylene glycol), ketones (such as acetone, methyl ethyl ketone (MEK), cyclohexanone, methyl isobutyl ketone, diacetone alcohol, cycloheptanone, and diethyl ketone), ethers (such as 1,4-dioxane, dioxolane, diisopropyl ether dioxane, and tetrahydrofuran), aliphatic hydrocarbons (such as hexane), alicyclic hydrocarbons (such as cyclohexane), aromatic hydrocarbons (such as toluene and xylene), halocarbons (such as dichloromethane and dichloroethane), esters (such as methyl formate, methyl acetate, ethyl acetate, propyl acetate, butyl acetate, and ethyl lactate), cellosolves (such as methyl cellosolve, ethyl cellosolve, and butyl cellosolve), cellosolve acetates, sulfoxides (such as dimethyl sulfoxide), amides (such as dimethylformamide and dimethylacetamide), and combinations thereof.

<Polymerization Initiator>

The polymerization initiator is a component which degrades, when exposed to light or heat, and generates radicals to initiate or promote polymerization (cross-linking) of a curable resin precursor. Examples of the polymerization initiator used in the light-transmitting functional layer composition include photopolymerization initiators (for example, photo-radical polymerization initiators, photo-cationic polymerization initiators, and photo-anionic polymerization initiators).

Examples of the above-described photo-radical polymerization initiator include benzophenone-based compounds, acetophenone-based compounds, acylphosphine oxide-based compounds, titanocene-based compounds, oxime ester-based compounds, benzoin ether-based compounds, and thioxantone.

Among the above-described photo-radical polymerization initiators, commercially available photo-radical polymerization initiators include, for example, Irgacure 184, Irgacure 369, Irgacure 379, Irgacure 651, Irgacure 819, Irgacure 907, Irgacure 2959, Irgacure OXE01, and Lucirin TPO (all are manufactured by BASF Japan Ltd.); NCI-930 (manufactured by ADEKA Corporation); SpeedCure EMK (manufactured by Nihon SiberHegner K.K.); and benzoin methyl ether, benzoin ethyl ether, and benzoin isopropyl ether (all are manufactured by Tokyo Chemical Industry Co., Ltd.).

Examples of the above-described photo-cationic polymerization initiator include aromatic diazonium salts, aromatic iodonium salts, and aromatic sulfonium salts. Among the above-described photo-cationic polymerization initiators, commercially available photo-cationic polymerization initiators include, for example, Adeka Optomer SP-150 and Adeka Optomer SP-170 (both are manufactured by ADEKA Corporation).

The content of the polymerization initiator in the light-transmitting functional layer composition is preferably 0.5 parts by mass or more and 10.0 parts by mass or less relative to 100 parts by mass of the ionizing radiation-polymerizable compound. By limiting the content of the polymerization initiator to a value within the above range, hard coat properties can be well maintained and cure inhibition can be prevented.

The method of applying the light-transmitting functional layer composition includes known coating methods, such as spin coating, dipping, spraying, slide coating, bar coating, roll coating, gravure coating, and die coating methods.

Figure 2B:
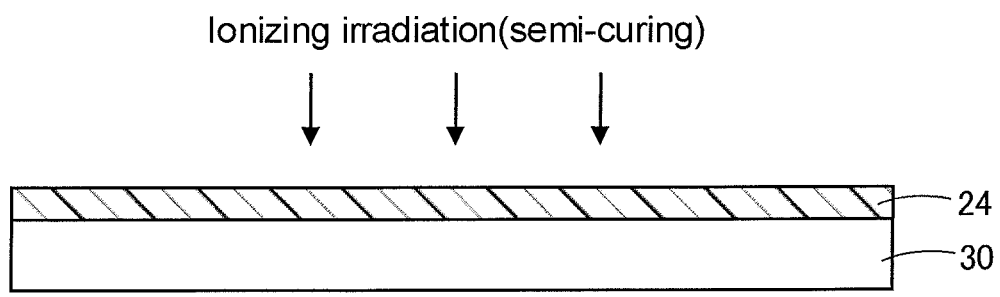

Next, the coating film 24 is exposed to ionizing radiation such as ultraviolet light, as shown in FIG. 2(B), to initiate polymerization (cross-linking) of the ionizing radiation-polymerizable compound, and the coating film 24 is thereby semi-cured (half cured). The term "semi-cured" as used herein means that curing substantially proceeds upon exposure to ionizing radiation. In cases where a coating film is semi-cured, the coating film is preferably cured without nitrogen purge because nitrogen purge causes hard curing of the light-transmitting functional layer.

In cases where ultraviolet light is used as the ionizing radiation for semi-curing of the coating film 24 of the light-transmitting functional layer composition, for example, ultraviolet light emitted from, for example, a super high pressure mercury lamp, high pressure mercury lamp, low pressure mercury lamp, carbon arc lamp, xenon arc lamp, or metal halide lamp can be used. Additionally, the wavelength range from 190 to 380 nm can be used as the wavelength of ultraviolet light. Specific examples of the source of electron beam include various types of electron beam accelerators, such as Cockcroft-Walton type, Van de Graft type, resonant transformer type, insulating core transformer type, linear type, Dynamitron type, and high frequency type accelerators.

Figure 2C:
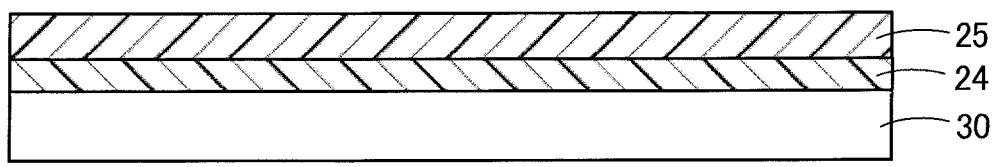

After semi-curing of the coating film 24, a core layer composition is applied and dried on the surface of the coating film 24 opposite the surface attached to the mold release film 30 to produce a coating film 25 of the core layer composition, as shown in FIG. 2(C). The core layer composition contains the ionizing radiation-polymerizable compound, as described above, and may be additionally supplemented with the above-described ultraviolet absorber, the above-described leveling agent, a solvent, and a polymerization initiator, as necessary. The solvent and polymerization initiator added to the core layer composition are similar to the solvent and polymerization initiator described in the section on the light-transmitting functional layer composition and, thus, further description thereof is omitted here.

Next, the coating film 25 is exposed to ionizing radiation such as ultraviolet light, as shown in FIG. 3(A), and the coating film 25 is thereby semi-cured (half cured). After semi-curing of the coating film 25, an adhesion-improving layer composition is applied and dried on the surface of the coating film 25 opposite the surface attached to the coating film 24 to produce a coating film 26 of the adhesion-improving layer composition, as shown in FIG. 3(B). The adhesion-improving layer composition contains the polyfunctional ionizing radiation-polymerizable compound and the silane coupling agent, as described above, and may be additionally supplemented with a solvent and a polymerization initiator, as necessary. The solvent and polymerization initiator added to the adhesion-improving layer composition are similar to the solvent and polymerization initiator described in the section on the light-transmitting functional layer composition and, thus, further description thereof is omitted here.

Next, the coating films 24 to 26 are exposed to ionizing radiation such as ultraviolet light for complete curing (full curing) of the coating films 24 to 26, as shown in FIG. 3(C). Thus, the light-transmitting functional layer 23, the core layer 21, and the adhesion-improving layer 22 are formed, and the protective film 20 and laminate 10 shown in FIG. 1 are obtained. The term "complete curing" as used herein means that curing substantially no more proceeds in spite of further light exposure. In this embodiment, the coating films 24 to 26 are semi-cured and then completely cured at the end, while the coating films 24 to 26 may be completely cured one by one without semi-curing.

<<<Polarizing Plate>>>

Figure 4:
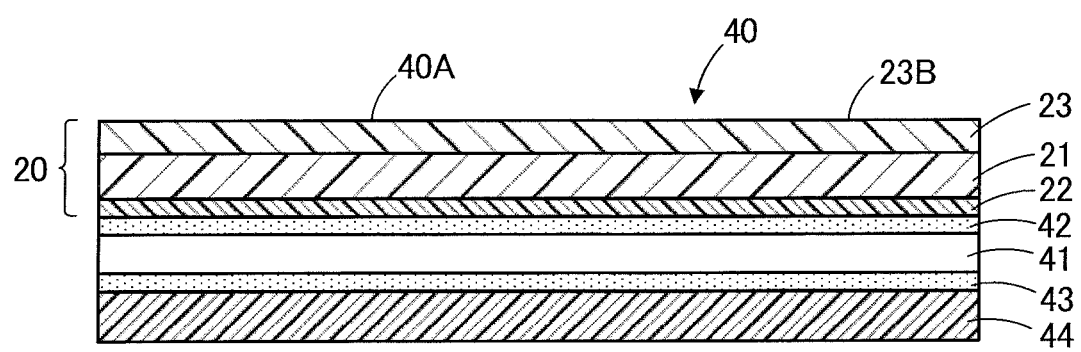
FIG. 4 depicts the schematic diagram of a polarizing plate according to the first embodiment.

The protective film 20 may be incorporated into, for example, a polarizing plate and then used. FIG. 4 depicts the schematic diagram of the polarizing plate in which the protective film according to the present embodiment is incorporated. As shown in FIG. 4, a polarizing plate 40 comprises a polarizer 41, the base material-less protective film 20 attached to one surface of the polarizer 41 through an adhesive 42, and a protective film 44 attached to the other surface of the polarizer 41 through an adhesive 43. In the polarizing plate 40, one of the protective films is the base material-less protective film 20. However, both the protective films may be composed of the base material-less protective film 20.

<<Polarizer>>

The polarizer 41 includes uniaxially stretched polyvinyl alcohol-based resin films stained with iodine or a dichroic pigment. As the polyvinyl alcohol-based resin, a saponified polyvinyl acetate-based resin can be used. Examples of the polyvinyl acetate-based resin include copolymers composed of vinyl acetate and another monomer capable of copolymerizing therewith, in addition to a homopolymer of vinyl acetate, namely polyvinyl acetate. Examples of said another monomer capable of copolymerizing with vinyl acetate include unsaturated carboxylic acids, olefins, vinyl ethers, unsaturated sulfonic acids, and acrylamides with ammonium groups.

The polyvinyl alcohol-based resin may undergo modification. For example, aldehyde-modified polyvinyl alcohol such as polyvinyl formal and polyvinyl acetal can be used.

<<Adhesive>>

Examples of the adhesives to attach the polarizer 41 to the protective film 20 and to attach the polarizer 41 to the protective film 44 include aqueous adhesives or ionizing radiation-curable adhesives. The term "aqueous adhesive" as used herein refers to an adhesive which is dissolved in the form of aqueous solution or water-dispersed emulsion, applied, then dried to remove water, and solidified to bond different surfaces together. Examples of the aqueous adhesive include polyvinyl alcohol adhesives, epoxy-based adhesives, and acryl-based adhesives. Among those adhesives, polyvinyl alcohol adhesives are commonly used for attachment of a polarizer. Additionally, the term "ionizing radiation-curable adhesive" refers to an adhesive which bonds different surfaces upon exposure of the adhesive composition containing an ionizing radiation-polymerizable compound to ionizing radiation. As the aqueous adhesive or ionizing radiation-curable adhesive, conventionally known aqueous adhesives or ionizing radiation-curable adhesives can be used.

<<Protective Film>>

The protective film 44 is a film to protect the polarizer 41. The protective film 44 is not a support for formation of the protective film 20 and thus does not meet the definition of the "base material" in this specification.

The protective film 44 is not limited to a particular protective film, and can be produced from, for example, one or more polymers selected from the group consisting of polyester-based resins, such as polyethylene terephthalate and polyethylene naphthalate; cellulose-based resins, such as diacetylcellulose and triacetylcellulose; acryl-based resins such as polymethyl methacrylate; styrene-based resins such as polystyrene and acrylonitrile-styrene copolymer (AS resin); polycarbonate-based resins; polyolefin-based resins such as polyethylene, polypropylene, and those having cyclo or norbornene structure; vinyl chloride-based resins; amide-based polymers, such as nylon and aromatic polyamide; imide-based polymers; sulfone-based polymers; polyether sulfone-based resins; polyether-ether ketone-based resins; polyphenylene sulfide-based resins; vinyl alcohol-based resins; vinylidene chloride-based resins; vinyl butyral-based resins; arylate-based resins; polyoxymethylene-based resins; and epoxy-based resins.

<<<Method of Producing the Polarizing Plate>>>

Figure 5A:
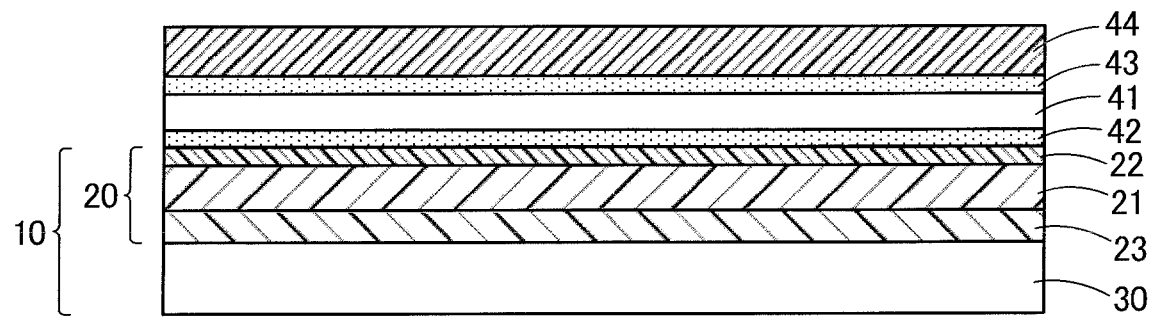
FIGS. 5(A) to 5(C) schematically show the production process of the polarizing plate according to the first embodiment.
Figure 5B:
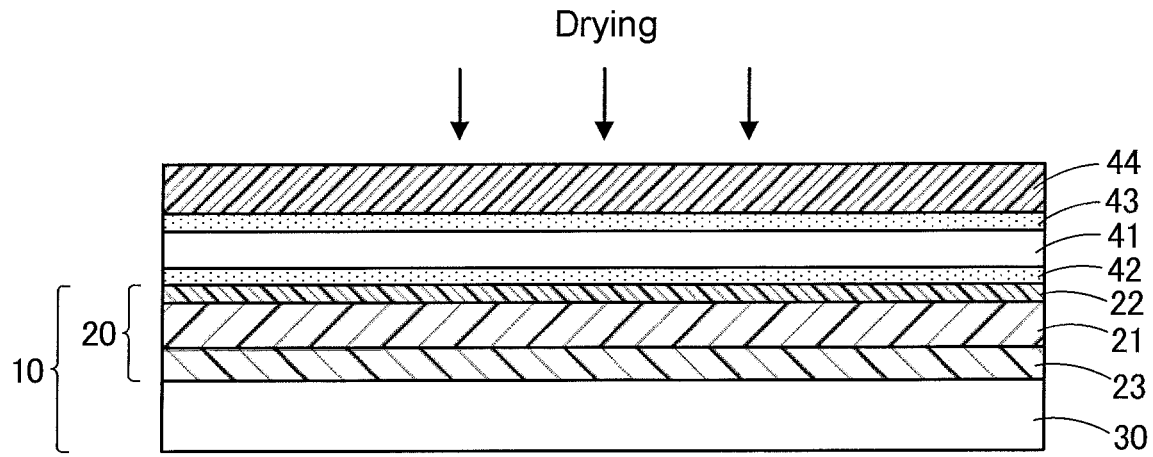
Figure 5C:
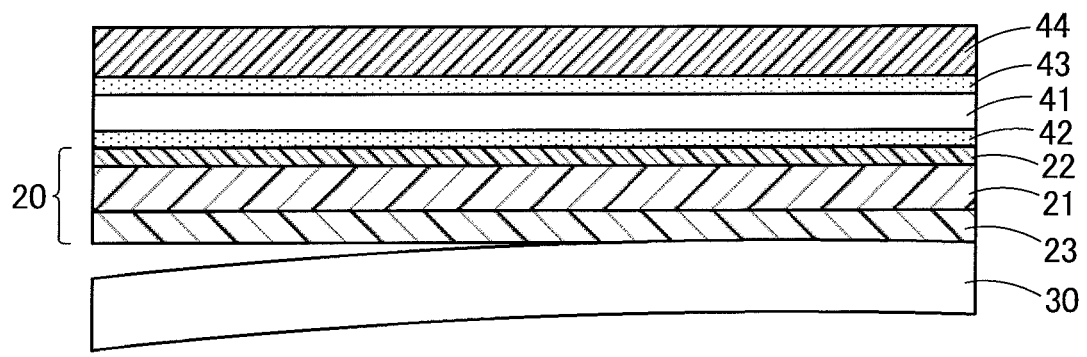

The polarizing plate 40 can be produced, for example, as follows. FIGS. 5(A) to 5(C) schematically show the production process of the polarizing plate according to the present embodiment. First, the laminate 10 is laminated to one surface of the polarizer 41 through the adhesive 42, such that the adhesive 42 is in contact with the adhesion-improving layer 22 of the laminate 10, as shown in FIG. 5(A). Meanwhile, the protective film 44 is laminated to the other surface of the polarizer 41 through the adhesive 43. At this step, the laminate 10 is preferably saponified before the laminate 10 is laminated to one surface of the polarizer 41 through the adhesive 42. When a leveling agent is added to the core layer 21 and/or the light-transmitting functional layer 23, the leveling agent migrates to the location in the vicinity of the surface 22A of the adhesion-improving layer 22 and potentially reduces adhesion to the adhesive 42. However, the saponification of the laminate 10 can result in removal of the leveling agent existing in the vicinity of the surface 22A of the adhesion-improving layer 22 and thus further increase in adhesiveness.

Next, the adhesives 42 and 43 are dried, as shown in FIG. 5(B). In cases where an aqueous adhesive is used as the adhesives, the laminate 10 and the protective film 44 are attached to the polarizer 41 during this drying process. Additionally, in cases where a radiation-curable adhesive is used as the adhesives, the laminate and the protective film are attached to the polarizer upon exposure of the laminate to ionizing radiation after the drying process.

After the laminate 10 and the protective film 44 are respectively attached to the polarizer 41 through the adhesives 42 and 43, the mold release film 30 is peeled off from the protective film 20, as shown in FIG. 5(C). Thus, the polarizing plate 40 shown in FIG. 4 is obtained.

According to the present embodiment, the adhesion-improving layer 22 is provided on the core layer 21 and thus can enhance adhesion to the adhesive 42. Adhesion to the adhesive 42 can be further enhanced particularly in cases where the adhesion-improving layer 22 contains a silane coupling agent having a hydrolyzable group(s). In other words, the silane coupling agent in the adhesion-improving layer 22 undergoes hydrolysis of its hydrolyzable group(s) to produce silanol group(s) during the saponification process or at contact with the adhesive. The silanol groups and the hydroxyl groups in the adhesive form hydrogen bonds, while dehydration condensation reaction is allowed to proceed during the drying process to form covalent bonds. Thus, the adhesion to the adhesive 42 can be further enhanced.

According to the present embodiment, the tensile break strength of the protective film 20 is 30 $N/mm^2$ or more, and thus the protective film 20 with excellent toughness can be obtained. In cases where a core layer is produced using a curable composition containing a polyfunctional ionizing radiation compound and a silane coupling agent, the resulting core layer is extremely hard, and thus a protective film with a tensile break strength of 30 $N/mm^2$ or more cannot be obtained. However, separation of layers as seen in the core layer 21 and the adhesion-improving layer 22 enables to obtain a protective film with a tensile break strength of 30 $N/mm^2$ or more.

In image display devices with direct bonding, the surface of a light-transmitting functional layer is coated with a hydrophilic adhesive composition and is thus preferred to have a low water contact angle. To obtain a light-transmitting functional layer with a low water contact angle, the surface of the light-transmitting functional layer is preferably uniform and flat. However, even in cases where a leveling agent is added to the light-transmitting functional layer to obtain a uniform and flat surface, very little of the leveling agent deposits on the surface and the leveling agent deposited on the surface, if any, forms sea-island structures, and no light-transmitting functional layer with a uniform and flat surface is thus obtained. On the other hand, in cases where areas of 1 μm square and 5 μm square on the surface 23B of the light-transmitting functional layer 23 each have an arithmetic mean roughness (Ra) of 0.5 nm or more and 1.5 nm or less, a maximum height (Rz) of 4 nm or more and 20 nm or less and a maximum peak height (Rp) of 2 nm or more and 15 nm or less, a protective film 20 with a uniform and flat surface 23B can be obtained. Thus, the contact angle of water on the surface 23B of the light-transmitting functional layer 23 can be reduced.

<<<Image Display Device>>>

Figure 6:
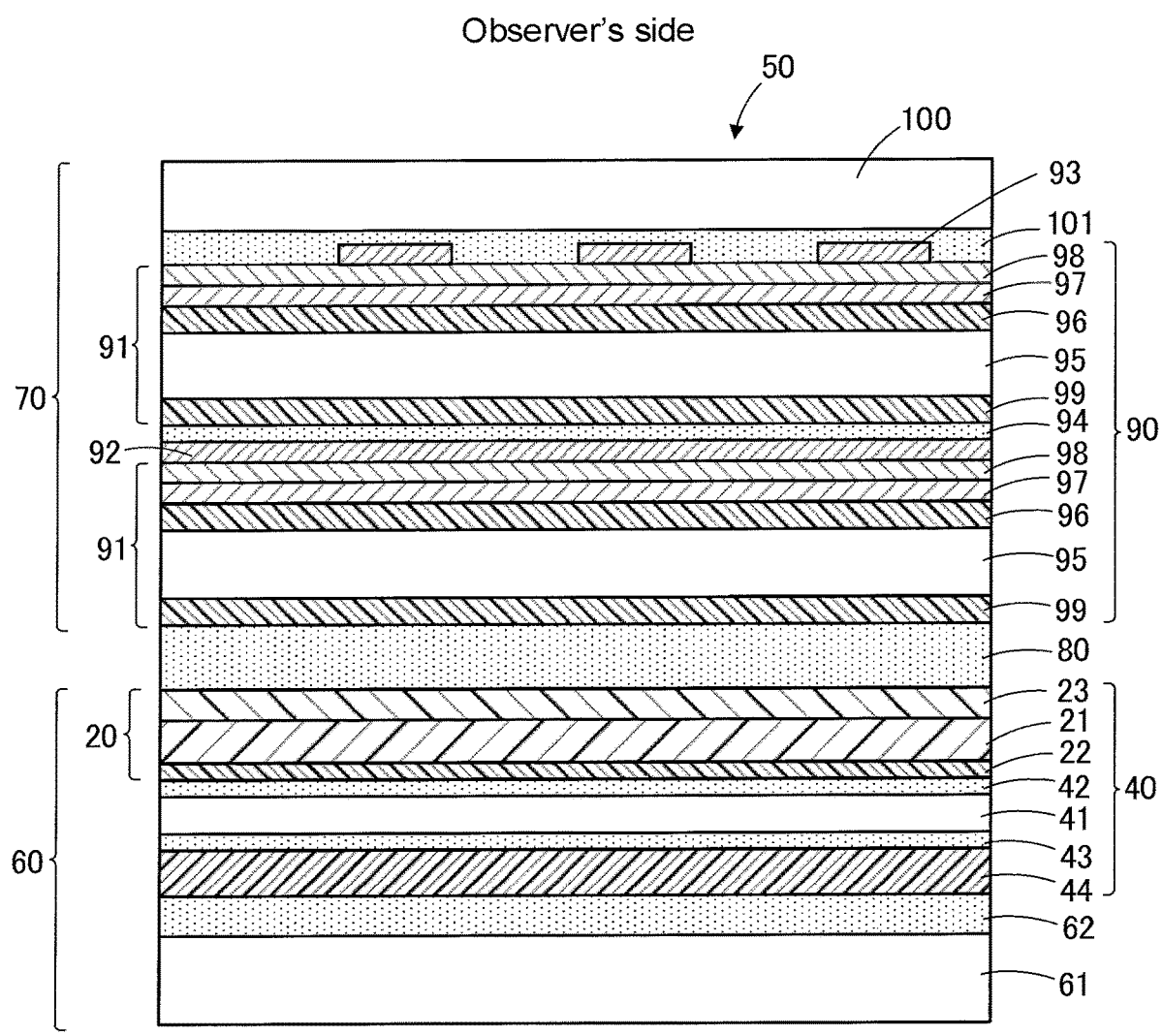
FIG. 6 depicts the schematic diagram of an image display device according to the first embodiment.

The protective film 20 and/or the polarizing plate 40 may be incorporated into, for example, an image display device and then used. FIG. 6 depicts the schematic diagram of the image display device according to the present embodiment. As shown in FIG. 6, an image display device 50 comprises a display panel 60 for displaying mainly images, a touch panel 70 placed on the observer's side of the display panel 60, and an adhesive 80 intervening between the display panel 60 and the touch panel 70. In this embodiment, the display panel 60 is an organic light-emitting diode display panel and thus the image display device 50 comprises no backlight unit. The backlight unit may or may not be required depending on the type of a display panel (display element).

<<Display Panel>>

The display panel 60 comprises a display element 61, a polarizing plate 40 placed on the observer's side of the display element 61, and an adhesive 62 intervening between the display element 61 and the polarizing plate 40, as shown in FIG. 6.

The display element 61 comprises an organic light-emitting diode (OLED). However, the display element 61 is not limited to an organic light-emitting diode display element, and may be, for example, a liquid crystalline, an inorganic light-emitting diode, and/or a Quantum Dot light-emitting diode (QLED).

The protective film 20 is placed on the observer's side of the display element 61 and on the observer's side of the polarizer 41. The surface 20B of the protective film 20 on the observer's side (the surface 23B of the light-transmitting functional layer 23) is in contact with the adhesive 80.

<<Touch Panel>>

The touch panel 70 comprises a sensor unit 90, a cover glass 100 placed on the observer's side of the sensor unit 90, and a transparent adhesive layer 101 to bond the sensor unit 90 and the cover glass 100 together. The touch panel 70 is only required to comprise the sensor unit 90 but may not comprise the cover glass 100 and the transparent adhesive layer 101. In addition, the touch panel according to the present embodiment is placed on the display element 61 (the on-cell structure); alternatively, the touch panel may be inside the display element 61 (the in-cell structure).

<Sensor Unit>

The sensor unit 90 is a unit that functions as a sensor of the touch panel 70. The sensor unit 90 is not limited to a particular sensor unit, and examples of the sensor unit include sensors used in projected capacitive-sensing schemes. In the structure of the sensor unit 90 shown in FIG. 6, a base material film 91 providing a patterned electroconductive layer 92 is laminated to another base material film 91 providing a patterned electroconductive layer 93 through a transparent adhesive layer 94.

<Base material Film>

The base material film 91 shown in FIG. 6 comprises a light-transmitting base material 95, a hard coat layer 96 provided on one surface of the light-transmitting base material 95, a high refractive index layer 97 provided on the hard coat layer 96, a low refractive index layer 98 provided on the high refractive index layer 97, and a hard coat layer 99 laminated to the other surface of the light-transmitting base material 95.

Instead of the base material film 91, a base material film may be used, which comprises a light-transmitting base material, a hard coat layer provided on one surface of the light-transmitting base material, a high refractive index layer provided on the hard coat layer, a low refractive index layer provided on the high refractive index layer, another hard coat layer provided on the other surface of the light-transmitting base material, another high refractive index layer provided on the hard coat layer, and a low refractive index layer laminated to the high refractive index layer. In this case, each of the low refractive index layers on both surfaces of the base material film is provided with a patterned electroconductive layer on its surface.

Light-transmitting base materials, hard coat layers, high refractive index layers and low refractive index layers used in the sensor units of common types of touch panels can be respectively used as the light-transmitting base material 95, the hard coat layers 96 and 99, the high refractive index layer 97 and the low refractive index layer 98 and, thus, further description thereof is omitted here.

<Electroconductive Layer>

The patterns of the electroconductive layers 92 and 93 are not limited to particular patterns, and examples of the patterns include square patterns and stripe patterns. The electroconductive layers 92 and 93 are connected to terminals (not shown) through collecting patterns (not shown). Electroconductive layers composed of a transparent electroconductive material are shown as examples of the electroconductive layers 92 and 93. However, the electroconductive layers may be composed of a conductive wire mesh. Examples of the transparent electroconductive material include metal oxides, such as tin-doped indium oxide (ITO), antimony-doped tin oxide (ATO), zinc oxide, indium oxide ($In_2O_3$), aluminum-doped zinc oxide (AZO), gallium-doped zinc oxide (GZO), tin oxide, zinc oxide-tin oxide system, indium oxide-tin oxide system, and zinc oxide-indium oxide-magnesium oxide system. Examples of materials for the conductive wire include light shielding metal materials, such as silver, copper, aluminium, and alloys thereof.

The film thickness of the electroconductive layers 92 and 93 are appropriately selected depending on the specifications such as electrical resistance, and are preferred to be, for example, 10 nm or more and 50 nm or less.

The method of producing the electroconductive layers 92 and 93 is not limited to a particular method; techniques such as sputtering, vacuum deposition, ion plating, CVD, coating, and printing can be used as the method. Examples of the method of forming a pattern on the electroconductive layers include photolithography.

In cases where the electroconductive layers are composed of a conductive wire mesh, the width of the conductive wire is preferably 1 μm or more and 20 μm or less, and more preferably 2 μm or more and 15 μm or less. Thus, the influence of the conductive wire on an image visually recognized by an observer can be reduced to a negligible level.

In cases where the electroconductive layers are composed of a conductive wire mesh, the electroconductive layers have, for example, rectangular openings surrounded by the conductive wire. The opening rates of the electroconductive layers are appropriately selected depending on, for example, the characteristics of the video light emitted from a display device, and range, for example, from 80% or more to 90% or less. Additionally, the interval between the openings is appropriately set to a length within the range from 100 μm or more to 1000 μm or less, depending on the required opening rate and the width of the conductive wire.

<<Adhesive>>

The adhesive 80 intervenes between the display panel 60 and the touch panel 70, and is attached to both the display panel 60 and the touch panel 70. Thus, the display panel 60 and the touch panel 70 are bonded together. The adhesives 62 and 80 are composed of a cured product of a curable adhesive composition (for example, OCR: optically clear resin) containing an ionizing radiation-polymerizable compound.

Second Embodiment

Figure 7:
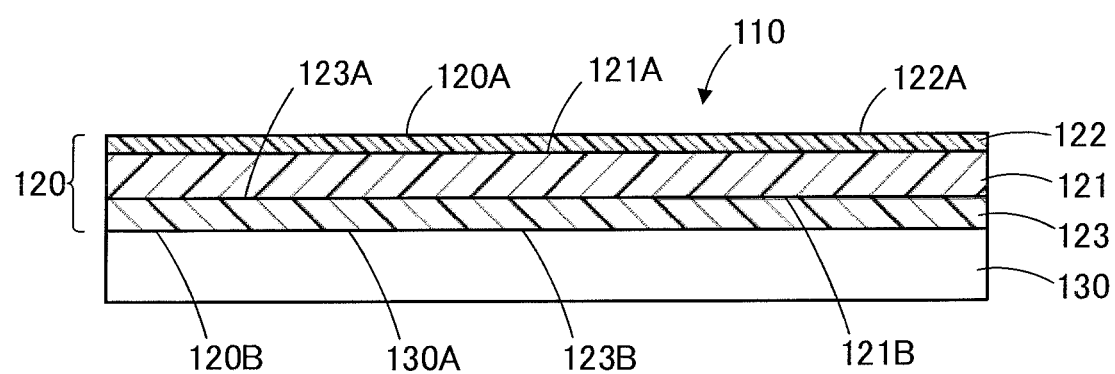
FIG. 7 depicts the schematic diagram of a laminate according to the second embodiment.

An optical film, a laminate, a polarizing plate and an image display device according to the second embodiment of the present invention are now described with reference to the drawings. FIG. 7 depicts the schematic diagram of the optical film according to the present embodiment, and FIGS. 8(A) to 8(C) and FIGS. 9(A) to 9(C) schematically show the production process of the optical film according to the present embodiment.

<<<Optical Film and Laminate>>>

A laminate 110 shown in FIG. 7 comprises an optical film 120 and a mold release film 130 laminated to the optical film 120.

<<Optical Film>>

The optical film 120 is an optical film comprising no base materials, that is, a base material-less optical film. The mold release film 130 is finally peeled off from the optical film 120 and thus is not a part of the optical film 120.

The optical film 120 comprises a core layer 121 and a deposition-inhibiting layer 122 provided on one surface 121A of the core layer 121. The optical film 120 may further comprise a light-transmitting functional layer 123 provided on the other surface 121B of the core layer 121.

The thickness of optical film 120 is less than 40 μm from the viewpoint of reducing the thickness of the optical film 120. The thickness of optical film 120 can be measured by the same method as for the thickness of the protective film 20. The thickness of the optical film 120 is preferably less than 21 μm, more preferably less than 15 μm, and most preferably less than 10 μm, from the viewpoint of reducing the thickness of the optical film 120.

The optical film 120 shown in FIG. 7 is a three-layer structure composed of the light-transmitting functional layer 123, the core layer 121 and the deposition-inhibiting layer 122, and interfaces between the layers may not necessarily be clear. In cases where the interfaces between the layers are not clear, the identities of the light-transmitting functional layer, the core layer and the deposition-inhibiting layer can be determined by analyzing the components of the respective layers.

The tensile break strength of the optical film 120 is 30 N/mm$^2$ or more. The tensile break strength of the optical film 120 is measured, in accordance with JIS K7161-1: 2014, using a Tensilon universal tester to pull a strip of the optical film with a width of 25 mm and a distance between chucks of 80 mm at a test speed of 300 mm/min, in which the tensile break strength is determined as the maximum stress applied to the optical film when the optical film breaks. The arithmetic mean of three measurements is determined as the tensile break strength. The tensile break strength should be measured on the optical film 120 with the mold release film 130 peeled off. The tensile break strength of the optical film 120 is preferably 40 N/mm$^2$ or more.

The water vapor permeability of the optical film 120 is preferably 100 g/(m$^2$·24 h) or more and 600 g/(m$^2$·24 h) or less. In cases where the water vapor permeability of the optical film is less than 100 g/(m$^2$·24 h), little moisture is transmitted through the optical film when an aqueous adhesive is applied, and wrinkles are thus easily produced. In cases where the water vapor permeability of the optical film is more than 600 g/(m$^2$·24 h), the moisture may cause deterioration of an organic light-emitting diode when the organic light-emitting diode is used as a display element. The arithmetic mean of three measurements is determined as the water vapor permeability. The water vapor permeability should be measured on the optical film 120 with the mold release film 130 peeled off. More preferably, the lower limit of the water vapor permeability of the optical film 120 is 200 g/(m$^2$·24 h) or more and the upper limit is 500 g/(m$^2$·24 h) or less.

The optical film 120 preferably shows 7% or less of light transmittance at a wavelength of 380 nm. By limiting the light transmittance of the optical film 120 in this wavelength range of light to a value of 7% or less, the optical film 120 used in a mobile device such as smartphone or tablet terminal can prevent degradation of its polarizer due to exposure to ultraviolet light. The uppermost light transmittance of the optical film is more preferably 5% at a wavelength of 380 nm. The light transmittance can be measured using a spectrophotometer (product name "UV-2450"; manufactured by Shimadzu Corporation). The arithmetic mean of three measurements is determined as the above transmittance.

The optical film 120 preferably has a haze value (total haze value) of less than 1%. By limiting the haze value of the optical film 120 to a value of less than 1%, the optical film 120 used in a mobile device can prevent its display screen from turning white. The upper limit of the haze value of the optical film 120 is more preferably less than 0.5%, further preferably 0.4% or less, further preferably 0.3% or less, and most preferably 0.2% or less. The haze value as used herein refers to the haze value of the optical film before the moist heat resistance test described below, but the haze value of the optical film after the moist heat resistance test is also preferably less than 1%. The haze value of the optical film 120 obtained after the moist heat resistance test is more preferably less than 0.5%, and most preferably 0.3% or less. The haze values can be determined using a haze meter (product name "HM-150"; manufactured by Murakami Color Research Laboratory Co., Ltd.) in accordance with JIS K7136: 2000. The arithmetic mean of three measurements is determined as the haze value. The light transmittance and haze value of the optical film 120 can be achieved, for example, by adjusting the amount of an added ultraviolet absorber in, for example, the core layer 121.

The optical film 120 can be cut into a desired size or may be rolled. In cases where the optical film 120 is cut into a desired size, the optical film is not limited to a particular size, and the size of the film is appropriately determined depending on the display size of an image display device such as, for example, smartphone, tablet terminal, personal computer (PC), wearable terminal, digital signage, or television. Specifically, the optical film 120 may be, for example, 1 inch or more and 500 inch or less in size.

<<Core Layer>>

The core layer 121 contains a binder resin made of a cured product and an ultraviolet absorber (UVA) dispersed in the binder resin. The additives and the film thickness of the core layer 121 are similar to those of the core layer 21 and, thus, further description thereof is omitted here.

<Binder Resin>

The binder resin is a resin made of a cured product, as described above. The resin is similar to the resin which is a component of the core layer 21 described in the section on the first embodiment and, thus, further description thereof is omitted here.

<Ultraviolet Absorber>

The ultraviolet absorber is similar to the ultraviolet absorber described in the section on the first embodiment and, thus, further description thereof is omitted here.

The core layer 121 may contain a leveling agent. The core layer 121 may contain other components as necessary, such as, for example, a lubricant, a plasticizer, a bulking agent, a filler, an anti-static agent, an anti-blocking agent, a cross-linking agent, a photostabilizer, and a coloring agent such as dye or pigment.

<Leveling Agent>

The leveling agent is similar to the leveling agent described in the section on the first embodiment and, thus, further description thereof is omitted here.

<<Deposition-Inhibiting Layer>>

The deposition-inhibiting layer 122 is a layer to inhibit deposition of an ultraviolet absorber. The deposition-inhibiting layer 122 is not limited to a particular deposition-inhibiting layer as long as it can prevent deposition of an ultraviolet absorber. It can be determined whether or not a layer in an optical film is a deposition-inhibiting layer, by performing a moist heat resistance test on the optical film, in which the optical film is left for 24 hours in the environment at a temperature of 80° C. and a relative humidity of 90%, and determining whether or not the ratio of the haze value in the optical film after the moist heat resistance test to that before the moist heat resistance test is 10 or less. In other words, if the ratio of the haze value in the optical film after the moist heat resistance test to that before the moist heat resistance test is 10 or less when a certain layer is placed on the core layer, the certain layer on the core layer should be a deposition-inhibiting layer. The haze values can be determined using a haze meter (product name "HM-150"; manufactured by Murakami Color Research Laboratory Co., Ltd.)

in accordance with JIS K7136: 2000. The arithmetic mean of three measurements is determined as the haze value. The ratio of the haze value in the optical film 120 obtained after the moist heat resistance test to that obtained before the moist heat resistance test is preferably 5 or less, and more preferably 3 or less.

A surface 122A of the deposition-inhibiting layer 122 is coated with, for example, an aqueous adhesive described below. Thus, the contact angle of water on the surface 122A of the deposition-inhibiting layer 122 after saponification is preferably 80° or less. The saponification should be performed by immersing the optical film or the laminate in a 2 N sodium hydroxide aqueous solution at 55° C. for 3 minutes. The contact angle of water on the surface 122A of the deposition-inhibiting layer 122 can be measured using a microscopic contact angle meter (product name "CA-QI Series"; manufactured by Kyowa Interface Science Co., Ltd.) according to the sessile drop method described in JIS R3257-1999. The contact angle of water on the surface 122A of the deposition-inhibiting layer 122 is more preferably 70° or less.

The film thickness of the deposition-inhibiting layer 122 is preferably 100 nm or more and less than 800 nm. In cases where the film thickness of the deposition-inhibiting layer 122 is less than 100 nm, deposition of the ultraviolet absorber may not be inhibited. In cases where the film thickness of the deposition-inhibiting layer 122 is 800 nm or less, the deposition-inhibiting layer may suffer from high cure shrinkage and poor adhesion with the core layer. The film thickness of the deposition-inhibiting layer 122 can be measured by the same measurement method as for the film thickness of the core layer 21. The lower limit of the film thickness of the deposition-inhibiting layer 122 is more preferably 150 nm or more. The upper limit of the film thickness of the deposition-inhibiting layer 122 is more preferably 600 nm or less, and most preferably 500 nm or less.

The deposition-inhibiting layer 122 preferably contains a resin made of a cured product (polymerization product) of a polyfunctional ionizing radiation-polymerizable compound. The deposition-inhibiting layer may be a layer made of the resin alone or preferably contains a silane coupling agent, in addition to the resin, from the viewpoint of enhancing adhesion to an adhesive. In cases where the deposition-inhibiting layer 122 contains a silane coupling agent, the resin functions as a binder resin.

<Resin>

The resin is preferably composed of a cured product of a polyfunctional ionizing radiation-polymerizable compound, as described above. The term "polyfunctional ionizing radiation-polymerizable compound" refers to a compound having two or more ionizing radiation-polymerizable functional groups in the molecule. Examples of the polyfunctional ionizing radiation-polymerizable compound include polyfunctional ionizing radiation-polymerizable monomers, polyfunctional ionizing radiation-polymerizable oligomers, polyfunctional ionizing radiation-polymerizable prepolymers, and combinations thereof. The polyfunctional ionizing radiation-polymerizable compound more preferably has three or more ionizing radiation-polymerizable functional groups in the molecule. The weight average molecular weight of the polyfunctional ionizing radiation-polymerizable monomer is preferably less than 1000, while the weight average molecular weight of the polyfunctional ionizing radiation-polymerizable oligomer or prepolymer is preferably 1000 or more and 20000 or less.

Examples of the polyfunctional ionizing radiation-polymerizable compound include esters between polyhydric alcohols and (meth)acrylic acids, polyfunctional heterocyclic (meth)acrylates, polyfunctional urethane (meth)acrylate, polyfunctional polyester (meth)acrylate, polyfunctional epoxy (meth)acrylate, and combinations thereof.

<Silane Coupling Agent>

The silane coupling agent is similar to the silane coupling agent described in the section on the first embodiment and, thus, further description thereof is omitted here.

<<Light-Transmitting Functional Layer>>

The surface 123B of the light-transmitting functional layer 123 opposite the surface 123A attached to the core layer 121 (hereinafter, this surface is referred to as "the surface of the light-transmitting functional layer") is the other surface 120B of the optical film 120. Areas of 1 µm square (1 µm×1 µm) and 5 µm square (5 µm×5 µm) on the surface 123B of the light-transmitting functional layer 123 each preferably have an arithmetic mean roughness (Ra) of 0.5 nm or more and 1.5 nm or less, a maximum height (Rz) of 4 nm or more and 20 nm or less, and a maximum peak height (Rp) of 2 nm or more and 15 nm or less. In addition to those described above, the light-transmitting functional layer 123 is similar to the light-transmitting functional layer 23 described in the section on the first embodiment and, thus, further description thereof is omitted here.

<<Mold Release Film>>

The mold release film 130 is a film which is peeled off from the optical film 120 to transfer the optical film 120 into a polarizing plate described below. The mold release film 130 is similar to the mold release film 30 and, thus, further description thereof is omitted here.

<<<Methods of Producing the Optical Film and the Laminate>>>

Figure 8A:
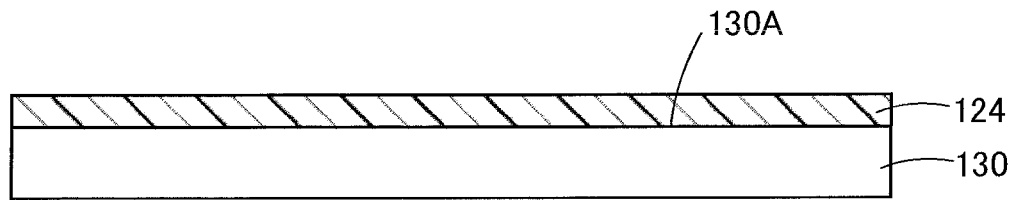
FIGS. 8(A) to 8(C) schematically show the production process of the laminate according to the second embodiment.

The laminate 110 and the optical film 120 can be produced, for example, as follows. First, a light-transmitting functional layer composition is applied and dried on one surface 130A of a mold release film 130 to produce a coating film 124 of the light-transmitting functional layer composition, as shown in FIG. 8(A). The light-transmitting functional layer composition is similar to the light-transmitting functional layer composition described in the section on the first embodiment and, thus, further description thereof is omitted here.

Figure 8B:
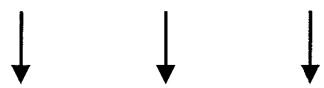
Figure 8B:
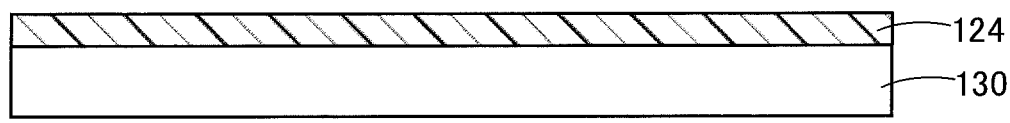

Next, the coating film 124 is exposed to ionizing radiation such as ultraviolet light, as shown in FIG. 8(B), to initiate polymerization (cross-linking) of the ionizing radiation-polymerizable compound, and the coating film 124 is thereby semi-cured (half cured).

Figure 8C:
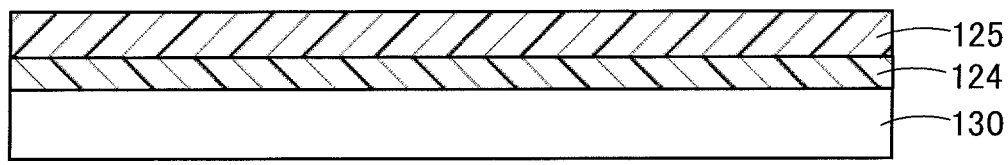

After semi-curing of the coating film 124, a core layer composition is applied and dried on the surface of the coating film 124 opposite the surface attached to the mold release film 130 to produce a coating film 125 of the core layer composition, as shown in FIG. 8(C). The core layer composition contains the ionizing radiation-polymerizable compound and the ultraviolet absorber, as described above, and may additionally contain the above-described leveling agent, a solvent, and a polymerization initiator, as necessary. The solvent and polymerization initiator added to the core layer composition are similar to the solvent and polymerization initiator described in the section on the light-transmitting functional layer composition in the first embodiment and, thus, further description thereof is omitted here.

Figure 9A:
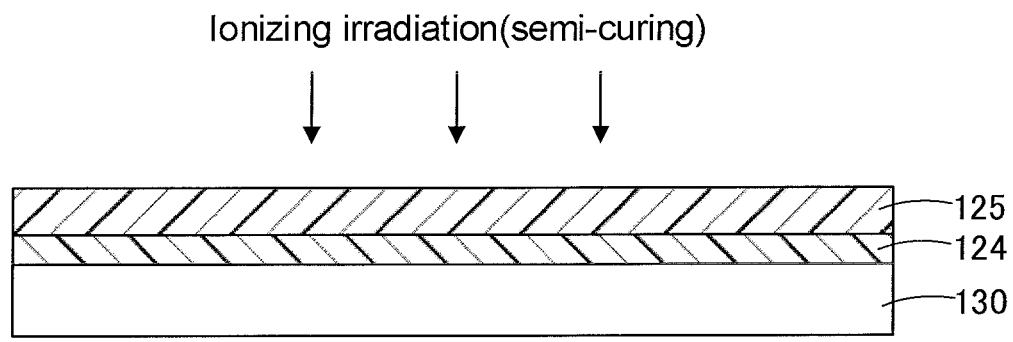
FIGS. 9(A) to 9(C) schematically show the production process of the laminate according to the second embodiment.
Figure 9B:
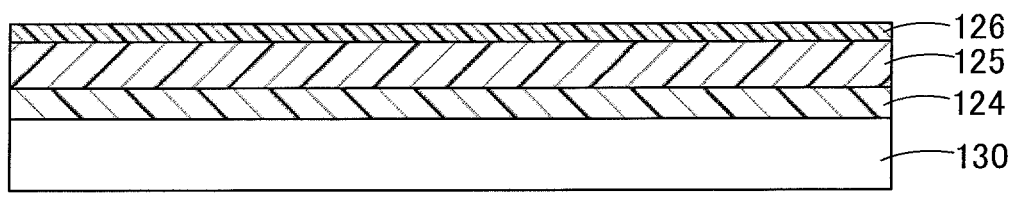

Next, the coating film 125 is exposed to ionizing radiation such as ultraviolet light, as shown in FIG. 9(A), and the coating film 125 is thereby semi-cured (half cured). After semi-curing of the coating film 125, a deposition-inhibiting layer composition is applied and dried on the surface of the coating film 125 opposite the surface attached to the coating film 124 to produce a coating film 126 of the deposition-inhibiting layer composition, as shown in FIG. 9(B). The deposition-inhibiting layer composition contains the polyfunctional ionizing radiation-polymerizable compound and the silane coupling agent, as described above, and may additionally contain a solvent and a polymerization initiator, as necessary. The solvent and polymerization initiator added to the deposition-inhibiting layer composition are similar to the solvent and polymerization initiator described in the section on the light-transmitting functional layer composition and, thus, further description thereof is omitted here.

Figure 9C:
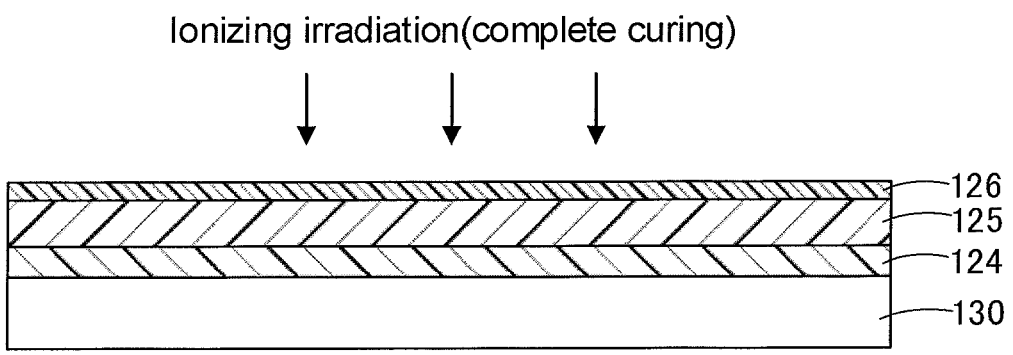

Next, the coating films 124 to 126 are exposed to ionizing radiation such as ultraviolet light for complete curing (full curing) of the coating films 124 to 126, as shown in FIG. 9(C). Thus, the light-transmitting functional layer 123, the core layer 121, and the deposition-inhibiting layer 122 are formed, and the optical film 120 and laminate 110 shown in FIG. 7 are obtained. In this embodiment, the coating films 124 to 126 are semi-cured and then completely cured at the end, while the coating films 124 to 126 may be completely cured one by one without semi-curing.

<<<Polarizing Plate>>>

Figure 10:
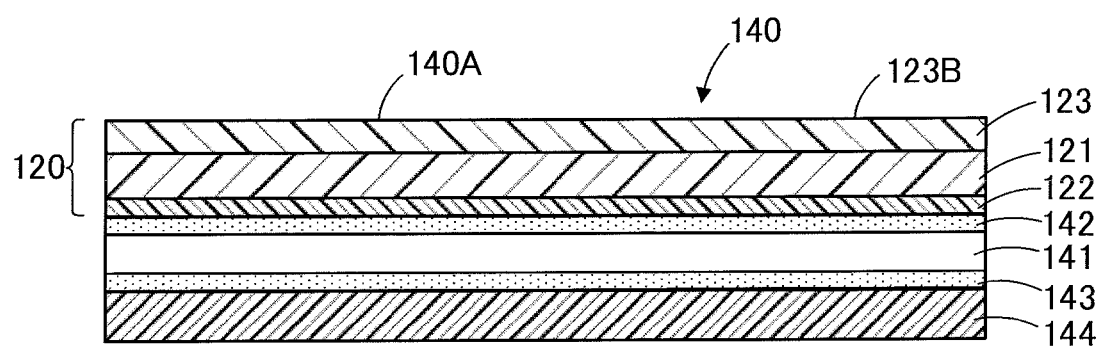
FIG. 10 depicts the schematic diagram of a polarizing plate according to the second embodiment.

The optical film 120 may be incorporated into, for example, a polarizing plate and then used. FIG. 10 depicts the schematic diagram of the polarizing plate in which the optical film according to the present embodiment is incorporated. As shown in FIG. 10, a polarizing plate 140 comprises a polarizer 141, the optical film 120 attached to one surface of the polarizer 141 through an adhesive 142, and a protective film 144 attached to the other surface of the polarizer 141 through an adhesive 143.

<<Polarizer>>

The polarizer 141 is similar to the polarizer 41 described in the section on the first embodiment and, thus, further description thereof is omitted here.

<<Adhesive>>

Examples of the adhesives 142 and 143 to attach the polarizer 141 to the optical film 120 and to attach the polarizer 141 to the protective film 144 include aqueous adhesives and ionizing radiation-curable adhesives.

<<Protective Film>>

The protective film 144 is similar to the protective film 44 described in the section on the first embodiment and, thus, further description thereof is omitted here.

<<<Method of Producing the Polarizing Plate>>>

Figure 11A:
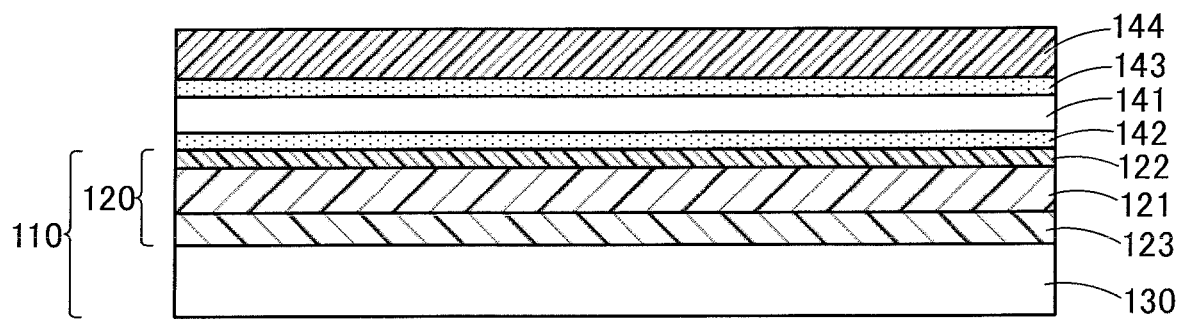
FIGS. 11(A) to 11(C) schematically show the production process of the polarizing plate according to the second embodiment.
Figure 11B:
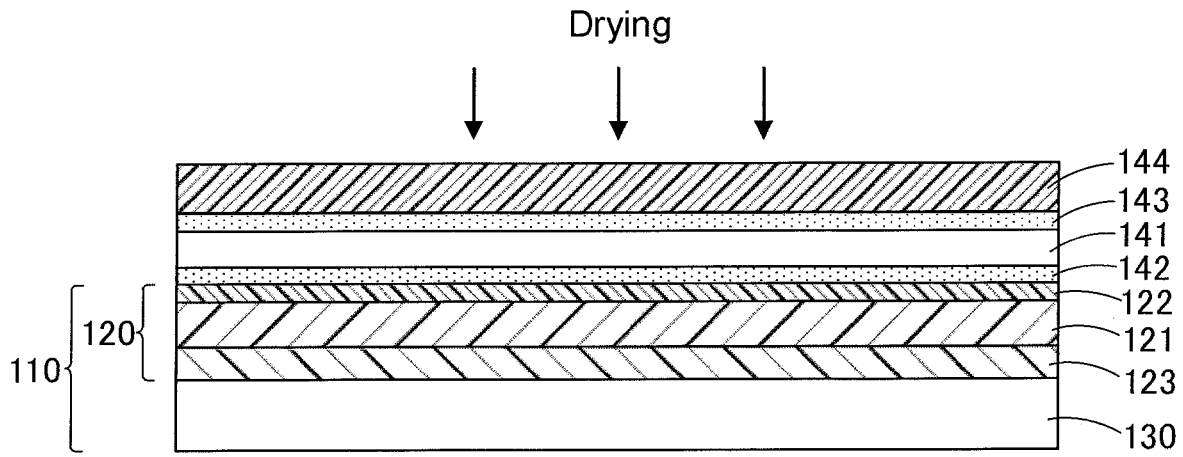
Figure 11C:
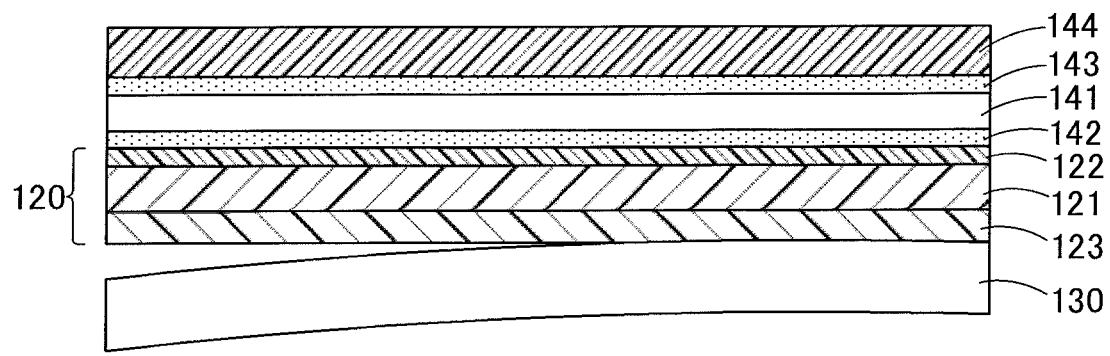

The polarizing plate 140 can be produced, for example, as follows. FIGS. 11(A) to 11(C) schematically show the production process of the polarizing plate according to the present embodiment. First, the laminate 110 is laminated to one surface of the polarizer 141 through the adhesive 142, such that the adhesive 142 is in contact with the deposition-inhibiting layer 122 of the laminate 110, as shown in FIG. 11(A). Meanwhile, the protective film 144 is laminated to the other surface of the polarizer 141 through the adhesive 143. At this step, the laminate 110 is preferably saponified before the laminate 110 is laminated to one surface of the polarizer 141 through the adhesive 142. When a leveling agent is added to the core layer 121 and/or the light-transmitting functional layer 123, the leveling agent migrates to the location in the vicinity of the surface 122A of the deposition-inhibiting layer 122 and potentially reduces adhesion to the adhesive 142. However, the saponification of the laminate 110 can result in removal of the leveling agent existing in the vicinity of the surface 122A of the deposition-inhibiting layer 122 and thus further increase in adhesiveness.

Next, the adhesives 142 and 143 are dried, as shown in FIG. 11(B). In cases where an aqueous adhesive is used as the adhesives, the laminate 110 and the protective film 144 are attached to the polarizer 141 during this drying process. Additionally, in cases where an ionizing radiation-curable adhesive is used as the adhesives, the laminate and the protective film are attached to the polarizer upon exposure of the laminate to ionizing radiation after the drying process.

After the laminate 110 and the protective film 144 are respectively attached to the polarizer 141 through the adhesives 142 and 143, the mold release film 130 is peeled off from the optical film 120, as shown in FIG. 11(C). Thus, the polarizing plate 140 shown in FIG. 10 is obtained.

According to the present embodiment, the deposition-inhibiting layer 122 is provided on the core layer 121 and thus can prevent deposition of the ultraviolet absorber on the surface 122A of the deposition-inhibiting layer 122. Particularly in cases where the deposition-inhibiting layer 122 contains a resin made of a cured product of a polyfunctional ionizing radiation-polymerizable compound rather than a resin made of a cured product of a monofunctional ionizing radiation-polymerizable compound, a high cross-linking density is achieved in the deposition-inhibiting layer 122, which blocks migration of the ultraviolet absorber beyond the surface 121A of the core layer 121 even if the ultraviolet absorber arrives there. Thus, deposition of the ultraviolet absorber can be further inhibited.

According to the present embodiment, the tensile break strength of the optical film 120 is 30 N/mm$^2$ or more, and thus the optical film 120 with excellent toughness can be obtained. In cases where a core layer is produced using a curable composition containing a polyfunctional ionizing radiation compound and a silane coupling agent, the resulting core layer is extremely hard, and thus an optical film with a tensile break strength of 30 N/mm$^2$ or more cannot be obtained. On the other hand, separation of the core layer 121 and the deposition-inhibiting layer 122 according to the present embodiment enables to obtain an optical film 120 with a tensile break strength of 30 N/mm$^2$ or more.

According to the present embodiment, the deposition-inhibiting layer 122 can inhibit deposition of the ultraviolet absorber and thus the ultraviolet absorber does not inhibit adhesion to the adhesives. Thus, a polarizing plate 140 having good adhesion of the optical film 120 to the adhesives can be obtained.

According to the present embodiment, adhesion to the adhesive 142 can be further enhanced in cases where the deposition-inhibiting layer 122 contains a silane coupling agent. In other words, the silane coupling agent in the deposition-inhibiting layer 122 undergoes hydrolysis of its hydrolyzable group(s) to produce silanol group(s) during the saponification process or at contact with the adhesive. The silanol groups and the hydroxyl groups in the adhesive form hydrogen bonds, while dehydration condensation reaction is allowed to proceed during the drying process to form covalent bonds. Thus, the adhesion to the adhesive 42 can be further enhanced.

In image display devices with direct bonding, the surface of a light-transmitting functional layer is coated with a hydrophilic adhesive composition and is thus preferred to have a low water contact angle. To obtain a light-transmitting functional layer with a low water contact angle, the surface of the light-transmitting functional layer is preferably uniform and flat. However, even in cases where a leveling agent is added to the light-transmitting functional layer to obtain a uniform and flat surface, very little of the leveling agent deposits on the surface and the leveling agent deposited on the surface, if any, forms sea-island structures, and no light-transmitting functional layer with a uniform and flat surface is thus obtained. On the other hand, in cases where areas of 1 μm square and 5 μm square on the surface 123B of the light-transmitting functional layer 123 each have an arithmetic mean roughness (Ra) of 0.5 nm or more and 1.5 nm or less, a maximum height (Rz) of 4 nm or more and 20 nm or less and a maximum peak height (Rp) of 2 nm or more and 15 nm or less, an optical film 120 with a uniform and flat surface 123B can be obtained. Thus, the contact angle of water on the surface 123B of the light-transmitting functional layer 123 can be reduced.

<<<Image Display Device>>>

Figure 12:
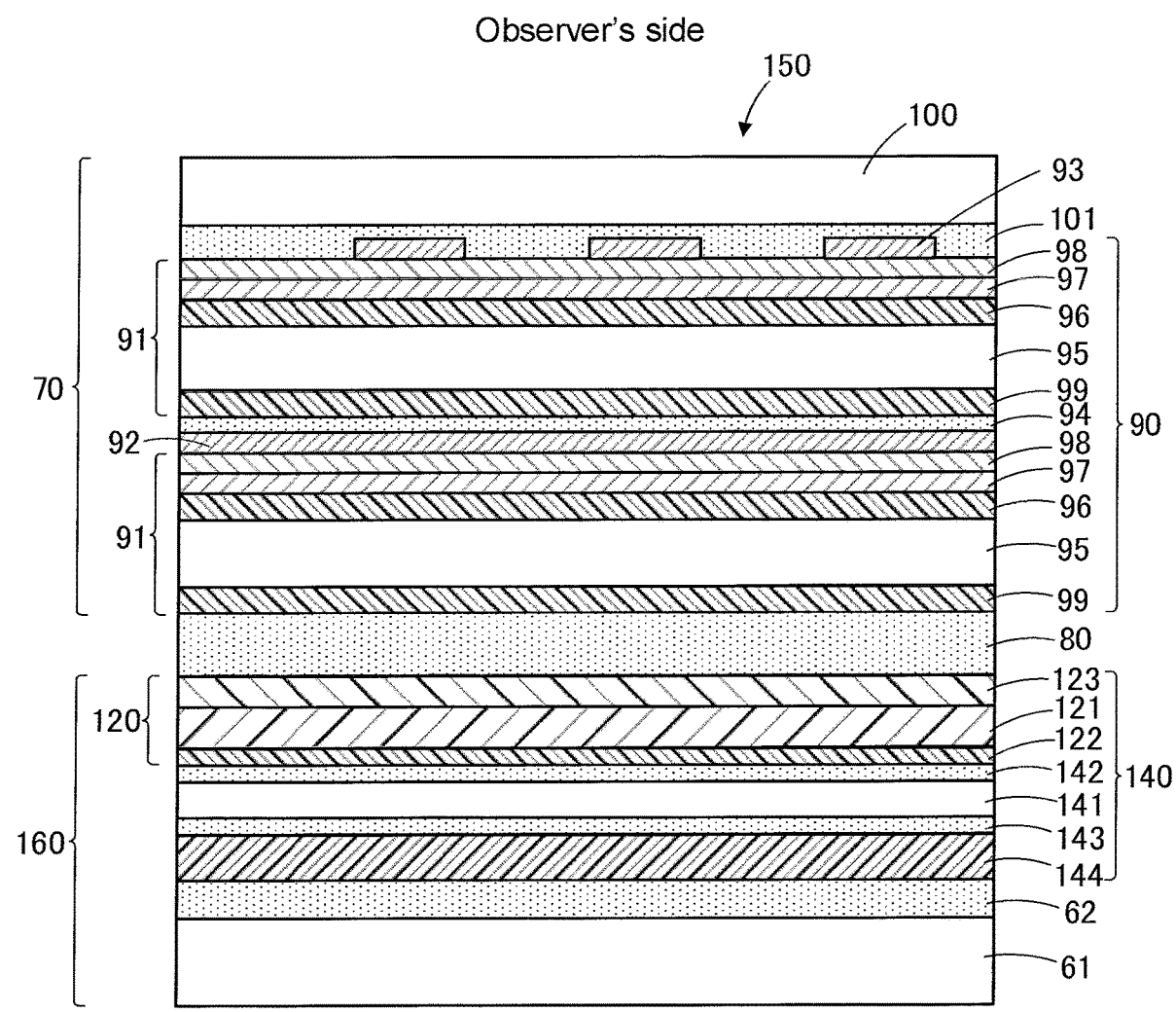
FIG. 12 depicts the schematic diagram of an image display device according to the second embodiment.

The optical film 120 and the polarizing plate 140 may be incorporated into, for example, an image display device and then used. FIG. 12 depicts the schematic diagram of the image display device according to the present embodiment. As shown in FIG. 12, an image display device 150 comprises a display panel 160 for displaying mainly images, a touch panel 70 placed on the observer's side of the display panel 160, and an adhesive 80 intervening between the display panel 160 and the touch panel 70. In this embodiment, the display panel 160 is an organic light-emitting diode display panel and thus the image display device 150 comprises no backlight unit. The backlight unit may or may not be required depending on the type of a display panel (display element). Like reference numbers are used in FIGS. 6 and 12 to indicate like elements and, thus, further description thereof is omitted.

<<Display Panel>>

The display panel 160 comprises a display element 61, a polarizing plate 140 placed on the observer's side of the display element 61, and an adhesive 62 intervening between the display element 61 and the polarizing plate 140, as shown in FIG. 12.

The optical film 120 is placed on the observer's side of the display element 61 and on the observer's side of the polarizer 141. The surface 120B of the optical film 120 on the observer's side (the surface 123B of the light-transmitting functional layer 123) is in contact with the adhesive 80.

EXAMPLES

Now, the present invention will be described in more detail by way of examples. However, the present invention is not limited to those examples. The term "a converted value in terms of 100% of solids" below means a value determined based on the assumption that the content of solids diluted in a solvent is 100%.

<Adhesion-Improving Layer Composition>

The following components were combined to meet the composition requirements indicated below and an adhesion-improving layer composition was thereby obtained.

(Adhesion-Improving Layer Composition 1)

Polyester acrylate (product name "M7100"; manufactured by Toagosei Co., Ltd.; polyfunctional): 4 parts by mass;
Silane coupling agent (product name "A1597"; manufactured by Tokyo Chemical Industry Co., Ltd.; reactive functional group: acryloyl group; hydrolyzable group: methoxy group): 1 part by mass;
Polymerization initiator (product name "Irgacure 184"; manufactured by BASF Japan Ltd.): 0.2 parts by mass;
Methyl isobutyl ketone (MIBK): 70 parts by mass;
Cyclohexanone: 25 parts by mass.

(Adhesion-Improving Layer Composition 2)

EO-modified isocyanurate diacrylate and triacrylate (product name "M313"; manufactured by Toagosei Co., Ltd.; a mixture of bifunctional and trifunctional compounds): 4 parts by mass;
Silane coupling agent (product name "A1597"; manufactured by Tokyo Chemical Industry Co., Ltd.; reactive functional group: acryloyl group; hydrolyzable group: methoxy group): 1 part by mass;
Polymerization initiator (product name "Irgacure 184"; manufactured by BASF Japan Ltd.): 0.2 parts by mass;
Methyl isobutyl ketone (MIBK): 70 parts by mass;
Cyclohexanone: 25 parts by mass.

(Adhesion-Improving Layer Composition 3)

Polyester acrylate (product name "M7100"; manufactured by Toagosei Co., Ltd.; polyfunctional): 4 parts by mass;
Silane coupling agent (product name "G0210"; manufactured by Tokyo Chemical Industry Co., Ltd.; reactive functional group: acryloyl group; hydrolyzable group: methoxy group): 1 part by mass;
Polymerization initiator (product name "Irgacure 184"; manufactured by BASF Japan Ltd.): 0.2 parts by mass;
Methyl isobutyl ketone (MIBK): 70 parts by mass;
Cyclohexanone: 25 parts by mass.

<Deposition-Inhibiting Layer Composition>

The following components were combined to meet the composition requirements indicated below and a deposition-inhibiting layer composition was thereby obtained.

(Deposition-Inhibiting Layer Composition 1)

Polyester acrylate (product name "M7100"; manufactured by Toagosei Co., Ltd.; polyfunctional): 4 parts by mass;
Silane coupling agent (product name "A1597"; manufactured by Tokyo Chemical Industry Co., Ltd.; reactive functional group: acryloyl group; hydrolyzable group: methoxy group): 1 part by mass;
Polymerization initiator (product name "Irgacure 184"; manufactured by BASF Japan Ltd.): 0.2 parts by mass;
Methyl isobutyl ketone (MIBK): 70 parts by mass;
Cyclohexanone: 25 parts by mass.

(Deposition-Inhibiting Layer Composition 2)

EO-modified isocyanurate diacrylate and triacrylate (product name "M313"; manufactured by Toagosei Co., Ltd.; a mixture of bifunctional and trifunctional compounds): 4 parts by mass;
Silane coupling agent (product name "A1597"; manufactured by Tokyo Chemical Industry Co., Ltd.; reactive functional group: acryloyl group; hydrolyzable group: methoxy group): 1 part by mass;
Polymerization initiator (product name "Irgacure 184"; manufactured by BASF Japan Ltd.): 0.2 parts by mass;
Methyl isobutyl ketone (MIBK): 70 parts by mass;
Cyclohexanone: 25 parts by mass.

(Deposition-Inhibiting Layer Composition 3)

Polyester acrylate (product name "M7100"; manufactured by Toagosei Co., Ltd.; polyfunctional): 4 parts by mass;
Silane coupling agent (product name "G0210"; manufactured by Tokyo Chemical Industry Co., Ltd.; reactive functional group: acryloyl group; hydrolyzable group: methoxy group): 1 part by mass;
Polymerization initiator (product name "Irgacure 184"; manufactured by BASF Japan Ltd.): 0.2 parts by mass;
Methyl isobutyl ketone (MIBK): 70 parts by mass;
Cyclohexanone: 25 parts by mass.

<Coat Layer Composition>

The following components were combined to meet the composition requirements indicated below and a coat layer composition was thereby obtained.

(Coat Layer Composition 1)
2-Ethylhexyl EO-modified acrylate (product name "M-120"; manufactured by Toagosei Co., Ltd.; monofunctional): 4 parts by mass;
Silane coupling agent (product name "A1597"; manufactured by Tokyo Chemical Industry Co., Ltd.; reactive functional group: acryloyl group; hydrolyzable group: methoxy group): 1 part by mass;
Polymerization initiator (product name "Irgacure 184"; manufactured by BASF Japan Ltd.): 0.2 parts by mass;
Methyl isobutyl ketone (MIBK): 70 parts by mass;
Cyclohexanone: 25 parts by mass.
(Coat Layer Composition 2)
Polyester acrylate (product name "M7100"; manufactured by Toagosei Co., Ltd.; polyfunctional): 4 parts by mass;
Polymerization initiator (product name "Irgacure 184"; manufactured by BASF Japan Ltd.): 0.2 parts by mass;
Methyl isobutyl ketone (MIBK): 70 parts by mass;
Cyclohexanone: 25 parts by mass.
(Coat Layer Composition 3)
Methoxy polyethylene glycol 1000 methacrylate (product name "M-230G"; manufactured by Shin-Nakamura Chemical Co., Ltd.; monofunctional): 4 parts by mass;
Silane coupling agent (product name "A1597"; manufactured by Tokyo Chemical Industry Co., Ltd.; reactive functional group: acryloyl group; hydrolyzable group: methoxy group): 1 part by mass;
Polymerization initiator (product name "Irgacure 184"; manufactured by BASF Japan Ltd.): 0.2 parts by mass;
Methyl isobutyl ketone (MIBK): 70 parts by mass;
Cyclohexanone: 25 parts by mass.
<Core Layer Composition>
The following components were combined to meet the composition requirements indicated below and a core layer composition 1 was thereby obtained.
(Core Layer Composition 1)
Urethane acrylate (ionizing radiation-polymerizable oligomer; product name "UV-3310B"; manufactured by The Nippon Synthetic Chemical Industry Co., Ltd.; weight average molecular weight: 5000; bifunctional): 40 parts by mass;
Polymerization initiator (product name "Irgacure 184"; manufactured by BASF Japan Ltd.): 4 parts by mass;
Leveling agent (product name "F568"; manufactured by DIC Corporation): 0.1 parts by mass (a converted value in terms of 100% of solids);
Ultraviolet absorber (product name "Tinuvin 400"; manufactured by BASF Japan Ltd.): 3 parts by mass;
Methyl isobutyl ketone (MIBK): 60 parts by mass.
(Core Layer Composition 2)
Urethane acrylate (ionizing radiation-polymerizable oligomer; product name "UA-4400"; manufactured by Shin-Nakamura Chemical Co., Ltd.; weight average molecular weight: 3000; bifunctional): 40 parts by mass;
Polymerization initiator (product name "Irgacure 184"; manufactured by BASF Japan Ltd.): 4 parts by mass;
Leveling agent (product name "F568"; manufactured by DIC Corporation): 0.1 parts by mass (a converted value in terms of 100% of solids);
Ultraviolet absorber (product name "Tinuvin 400"; manufactured by BASF Japan Ltd.): 3 parts by mass;
Methyl isobutyl ketone (MIBK): 60 parts by mass.
(Core Layer Composition 3)
Urethane acrylate (product name "UV-33106"; manufactured by The Nippon Synthetic Chemical Industry Co., Ltd.; weight average molecular weight: 5000; bifunctional): 32 parts by mass;
Silane coupling agent (product name "A1597"; manufactured by Tokyo Chemical Industry Co., Ltd.; reactive functional group: acryloyl group; hydrolyzable group: methoxy group): 8 parts by mass;
Polymerization initiator (product name "Irgacure 184"; manufactured by BASF Japan Ltd.): 4 parts by mass;
Leveling agent (product name "F568"; manufactured by DIC Corporation): 0.1 parts by mass (a converted value in terms of 100% of solids);
Ultraviolet absorber (product name "Tinuvin 400"; manufactured by BASF Japan Ltd.): 3 parts by mass;
Methyl isobutyl ketone (MIBK): 60 parts by mass.
(Core Layer Composition 4)
Urethane acrylate (product name "UV-3310B"; manufactured by The Nippon Synthetic Chemical Industry Co., Ltd.; weight average molecular weight: 5000; bifunctional): 32 parts by mass;
Polyester acrylate (product name "M7100"; manufactured by Toagosei Co., Ltd.; polyfunctional): 4 parts by mass;
Silane coupling agent (product name "A1597"; manufactured by Tokyo Chemical Industry Co., Ltd.; reactive functional group: acryloyl group; hydrolyzable group: methoxy group): 4 parts by mass;
Polymerization initiator (product name "Irgacure 184"; manufactured by BASF Japan Ltd.): 4 parts by mass;
Leveling agent (product name "F568"; manufactured by DIC Corporation): 0.1 parts by mass (a converted value in terms of 100% of solids);
Ultraviolet absorber (product name "Tinuvin 400"; manufactured by BASF Japan Ltd.): 3 parts by mass;
Methyl isobutyl ketone (MIBK): 60 parts by mass.
(Core Layer Composition 5)
Urethane acrylate (product name "UV-33106"; manufactured by The Nippon Synthetic Chemical Industry Co., Ltd.; weight average molecular weight: 5000; bifunctional): 40 parts by mass;
Polymerization initiator (product name "Irgacure 184"; manufactured by BASF Japan Ltd.): 4 parts by mass;
Leveling agent (product name "F568"; manufactured by DIC Corporation): 0.1 parts by mass (a converted value in terms of 100% of solids);
Ultraviolet absorber (product name "Tinuvin 479"; manufactured by BASF Japan Ltd.): 3 parts by mass;
Methyl isobutyl ketone (MIBK): 60 parts by mass.
(Core Layer Composition 6)
Urethane acrylate (product name "UV-3310B"; manufactured by The Nippon Synthetic Chemical Industry Co., Ltd.; weight average molecular weight: 5000; bifunctional): 40 parts by mass;
Polyester acrylate (product name "M7100"; manufactured by Toagosei Co., Ltd.; polyfunctional): 4 parts by mass;
Silane coupling agent (product name "A1597"; manufactured by Tokyo Chemical Industry Co., Ltd.; reactive functional group: acryloyl group; hydrolyzable group: methoxy group): 1 part by mass;
Polymerization initiator (product name "Irgacure 184"; manufactured by BASF Japan Ltd.): 4 parts by mass;
Leveling agent (product name "F568"; manufactured by DIC Corporation): 0.1 parts by mass (a converted value in terms of 100% of solids);
Ultraviolet absorber (product name "Tinuvin 400"; manufactured by BASF Japan Ltd.): 3 parts by mass;
Methyl isobutyl ketone (MIBK): 60 parts by mass.
<Hard Coat Layer Composition>
The following components were combined to meet the composition requirements indicated below and a hard coat layer composition was thereby obtained.

(Hard Coat Layer Composition 1)

Deformed reactive silica (inorganic particles, product name "ELCOM V8803"; manufactured by JGC C&C): 30 parts by mass;

Ethylene oxide-modified bisphenol A diacrylate (product name "BPE-20"; manufactured by DKS Co., Ltd.; bifunctional): 56 parts by mass;

Urethane acrylate prepolymer (product name "UN-350"; Negami Chemical Industrial Co., Ltd.; weight average molecular weight: 12500; bifunctional): 14 parts by mass;

Polymerization initiator (product name "Irgacure 184"; manufactured by BASF Japan Ltd.): 4 parts by mass;

Leveling agent (product name "F568"; manufactured by DIC Corporation): 0.1 parts by mass (a converted value in terms of 100% of solids);

Methyl isobutyl ketone (MIBK): 150 parts by mass.

Example A1

First, a one-side primer coated polyethylene terephthalate film (product name "Cosmoshine A4100"; manufactured by Toyobo Co., Ltd.) with a thickness of 100 μm was prepared as a mold release film, and the hard coat layer composition 1 was applied onto the uncoated surface of the polyethylene terephthalate film to form a coating film. Then, the formed coating film was dried by blowing dry air at 50° C. over it at a flow rate of 0.5 m/s for 15 seconds and then blowing dry air at 70° C. over it at a flow rate of 10 m/s for 30 seconds to evaporate the solvent in the coating film, and then exposed to ultraviolet light to a cumulative light dose of 200 mJ/cm$^2$ to semi-cure the coating film.

After semi-curing of the coating film of the hard coat layer composition 1, the above-described core layer composition 1 was applied onto the coating film of the hard coat layer composition 1 to form a coating film. Then, the formed coating film was dried by blowing dry air at 50° C. over it at a flow rate of 0.5 m/s for 15 seconds and then blowing dry air at 70° C. over it at a flow rate of 10 m/s for 30 seconds to evaporate the solvent in the coating film, and then exposed to ultraviolet light to a cumulative light dose of 300 mJ/cm$^2$ to semi-cure the coating film.

After semi-curing of the coating film of the core layer composition 1, the above-described adhesion-improving layer composition 1 was applied onto the coating film of the core layer composition 1 to form a coating film. Then, the formed coating film was dried by blowing dry air at 50° C. over it at a flow rate of 0.5 m/s for 15 seconds and then blowing dry air at 70° C. over it at a flow rate of 10 m/s for 30 seconds to evaporate the solvent in the coating film, and then exposed to ultraviolet light to a cumulative light dose of 500 mJ/cm$^2$ to cure all the coating films completely, and a protective film with a thickness of 35.5 μm, which comprised a hard coat layer with a film thickness of 10 μm, a core layer with a film thickness of 25 μm and an adhesion-improving layer with a film thickness of 500 nm in this order, and a laminate composed of the mold release film and the protective film were thereby formed. A cross-section of the protective film was photographed using a scanning electron microscope (SEM) and the thickness of the protective film was measured at 20 different locations within the image of the cross-section, and the average of the 20 thickness values was determined as the thickness of the protective film.

Next, the laminate was immersed in a 2 N sodium hydroxide aqueous solution at 55° C. for 3 minutes to saponify the laminate. Meanwhile, iodine was allowed to adsorb on a polyvinyl alcohol film and the resulting film was then uniaxially stretched and oriented to produce a polarizer, and a polyvinyl alcohol adhesive (an aqueous polyvinyl alcohol solution prepared by diluting a polyvinyl alcohol resin (product name "PVA-117"; manufactured by Kuraray Co., Ltd.) in pure water to a solid concentration of 5%) was further applied onto both surfaces of the polarizer.

The protective film, the polarizer, and a saponified triacetylcellulose base material (TAC base material) with a thickness of 80 μm were arranged such that the adhesion-improving layer of the protective film was in contact with one surface of the polarizer and the TAC base material was in contact with the other surface of the polarizer. The laminate was dried at 100° C. for 10 minutes, while keeping the configuration, to obtain a polarizing plate, in which the protective film and the TAC base material were attached to the polarizer through the polyvinyl alcohol adhesive.

The polyethylene terephthalate film was finally peeled off from the surface of the hard coat layer to give the identical polarizing plate except that the surface of the hard coat layer was exposed.

Example A2

In Example A2, a protective film and a polarizing plate were obtained in the same manner as in Example A1, except that the adhesion-improving layer composition 2 was used instead of the adhesion-improving layer composition 1.

Example A3

In Example A3, a protective film and a polarizing plate were obtained in the same manner as in Example A1, except that the adhesion-improving layer composition 3 was used instead of the adhesion-improving layer composition 1.

Example A4

In Example A4, a protective film and a polarizing plate were obtained in the same manner as in Example A1, except that the core layer composition 2 was used instead of the core layer composition 1.

Example A5

In Example A5, a protective film and a polarizing plate were obtained in the same manner as in Example A1, except that the core layer composition 3 was used instead of the core layer composition 1.

Comparative Example A1

In Comparative Example A1, a protective film and a polarizing plate were obtained in the same manner as in Example A1, except that an adhesion-improving layer was not formed. The protective film of Comparative Example A1 was composed of a hard coat layer and a core layer, while the core layer and the polarizer in the polarizing plate were bonded together by the polyvinyl alcohol adhesive.

Comparative Example A2

In Comparative Example A2, a protective film and a polarizing plate were obtained in the same manner as in Comparative Example A1, except that the core layer composition 2 was used instead of the core layer composition 1.

Comparative Example A3

In Comparative Example A3, a protective film and a polarizing plate were obtained in the same manner as in Comparative Example A1, except that the core layer composition 3 was used instead of the core layer composition 1.

Comparative Example A4

In Comparative Example A4, a protective film and a polarizing plate were obtained in the same manner as in Comparative Example A1, except that the core layer composition 4 was used instead of the core layer composition 1.

Comparative Example A5

In Comparative Example A5, a protective film and a polarizing plate were obtained in the same manner as in Example A1, except that the coat layer composition 1 was used instead of the adhesion-improving layer composition 1 and a coat layer with a film thickness of 500 nm, instead of an adhesion-improving layer, was formed on the core layer.

Comparative Example A6

In Comparative Example A6, a protective film and a polarizing plate were obtained in the same manner as in Example A1, except that the coat layer composition 2 was used instead of the adhesion-improving layer composition 1 and a coat layer with a film thickness of 500 nm, instead of an adhesion-improving layer, was formed on the core layer.

Comparative Example A7

In Comparative Example A7, a TAC base material (product name "TD80UL-M"; manufactured by Fujifilm Corporation) with a thickness of 80 μm was prepared, and the hard coat layer composition 1 was applied onto one surface of the TAC base material to form a coating film. Then, the formed coating film was dried by blowing dry air at 50° C. over it at a flow rate of 0.5 m/s for 15 seconds and then blowing dry air at 70° C. over it at a flow rate of 10 m/s for 30 seconds to evaporate the solvent in the coating film, and then exposed to ultraviolet light to a cumulative light dose of 200 mJ/cm$^2$ to cure the coating film. Thus, a base material-borne protective film, which comprised the TAC base material and a hard coat layer with a film thickness of 10 μm in this order, was obtained.

Next, the protective film was immersed in a 2 N sodium hydroxide aqueous solution at 55° C. for 3 minutes to saponify the protective film. Meanwhile, iodine was allowed to adsorb on a polyvinyl alcohol film and the resulting film was then uniaxially stretched and oriented to produce a polarizer, and a polyvinyl alcohol adhesive (an aqueous polyvinyl alcohol solution prepared by diluting a polyvinyl alcohol resin (product name "PVA-117"; manufactured by Kuraray Co., Ltd.) in pure water to a solid concentration of 5%) was further applied onto both surfaces of the polarizer.

The protective film, the polarizer, and another saponified TAC base material with a thickness of 80 μm were arranged such that the TAC base material of the protective film was in contact with one surface of the polarizer and the other TAC base material was in contact with the other surface of the polarizer. The laminate was dried at 100° C. for 10 minutes, while keeping the configuration, to obtain a polarizing plate, in which the protective film and the TAC base material were attached to the polarizer through the polyvinyl alcohol adhesive.

Example B1

First, an untreated polyethylene terephthalate film (product name "Cosmoshine A4100"; manufactured by Toyobo Co., Ltd.) with a thickness of 100 μm was prepared as a mold release film, and the hard coat layer composition 1 was applied onto one surface of the polyethylene terephthalate film to form a coating film. Then, the formed coating film was dried by blowing dry air at 50° C. over it at a flow rate of 0.5 m/s for 15 seconds and then blowing dry air at 70° C. over it at a flow rate of 10 m/s for 30 seconds to evaporate the solvent in the coating film, and then exposed to ultraviolet light to a cumulative light dose of 200 mJ/cm$^2$ to semi-cure the coating film.

After semi-curing of the coating film of the hard coat layer composition 1, the above-described core layer composition 1 was applied onto the coating film of the hard coat layer composition 1 to form a coating film. Then, the formed coating film was dried by blowing dry air at 50° C. over it at a flow rate of 0.5 m/s for 15 seconds and then blowing dry air at 70° C. over it at a flow rate of 10 m/s for 30 seconds to evaporate the solvent in the coating film, and then exposed to ultraviolet light to a cumulative light dose of 300 mJ/cm$^2$ to semi-cure the coating film.

After semi-curing of the coating film of the hard core layer composition 1, the above-described deposition-inhibiting layer composition 1 was applied onto the coating film of the core layer composition 1 to form a coating film. Then, the formed coating film was dried by blowing dry air at 50° C. over it at a flow rate of 0.5 m/s for 15 seconds and then blowing dry air at 70° C. over it at a flow rate of 10 m/s for 30 seconds to evaporate the solvent in the coating film, and then exposed to ultraviolet light to a cumulative light dose of 500 mJ/cm$^2$ to cure all the coating films completely, and an optical film with a thickness of 35.5 μm, which comprised a hard coat layer with a film thickness of 10 μm, a core layer with a film thickness of 25 μm and a deposition-inhibiting layer with a film thickness of 500 nm in this order, and a laminate composed of the mold release film and the optical film were thereby prepared.

Next, the laminate was immersed in a 2 N sodium hydroxide aqueous solution at 55° C. for 2 minutes to saponify the laminate. Meanwhile, iodine was allowed to adsorb on a polyvinyl alcohol film and the resulting film was then uniaxially stretched and oriented to produce a polarizer, and a polyvinyl alcohol adhesive (an aqueous polyvinyl alcohol solution prepared by diluting a polyvinyl alcohol resin (product name "PVA-117"; manufactured by Kuraray Co., Ltd.) in pure water to a solid concentration of 5%) was further applied onto both surfaces of the polarizer.

The optical film, the polarizer, and a triacetylcellulose base material (TAC base material) with a thickness of 80 μm were arranged such that the deposition-inhibiting layer of the optical film was in contact with one surface of the polarizer and the TAC base material was in contact with the other surface of the polarizer. The laminate was dried at 100° C. for 10 minutes, while keeping the configuration, to obtain a polarizing plate, in which the optical film and the TAC base material were attached to the polarizer through the polyvinyl alcohol adhesive.

The polyethylene terephthalate film was finally peeled off from the surface of the hard coat layer to give the identical polarizing plate except that the surface of the hard coat layer was exposed.

Example B2

In Example B2, an optical film and a polarizing plate were obtained in the same manner as in Example B1, except that the deposition-inhibiting layer composition 2 was used instead of the deposition-inhibiting layer composition 1.

Example B3

In Example B3, an optical film and a polarizing plate were obtained in the same manner as in Example B1, except that the deposition-inhibiting layer composition 3 was used instead of the deposition-inhibiting layer composition 1.

Example B4

In Example B4, an optical film and a polarizing plate were obtained in the same manner as in Example B1, except that the core layer composition 5 was used instead of the core layer composition 1.

Comparative Example B1

In Comparative Example B1, an optical film and a polarizing plate were obtained in the same manner as in Example B1, except that a deposition-inhibiting layer was not formed. The optical film of Comparative Example B1 was composed of a hard coat layer and a core layer, while the core layer and the polarizer in the polarizing plate were bonded together by the polyvinyl alcohol adhesive.

Comparative Example B2

In Comparative Example B2, an optical film and a polarizing plate were obtained in the same manner as in Comparative Example B1, except that the core layer composition 5 was used instead of the core layer composition 1.

Comparative Example B3

In Comparative Example B3, an optical film and a polarizing plate were obtained in the same manner as in Comparative Example B1, except that the core layer composition 6 was used instead of the core layer composition 1.

Comparative Example B4

In Comparative Example B4, an optical film and a polarizing plate were obtained in the same manner as in Example B1, except that a coat layer with a film thickness of 500 nm was formed on the core layer by using the coat layer composition 1 instead of the deposition-inhibiting layer composition 1.

Comparative Example B5

In Comparative Example B5, an optical film and a polarizing plate were obtained in the same manner as in Comparative Example B4, except that the core layer composition 5 was used instead of the core layer composition 1.

Comparative Example B6

In Comparative Example B6, an optical film and a polarizing plate were obtained in the same manner as in Example B1, except that a coat layer with a film thickness of 500 nm was formed on the core layer by using the coat layer composition 3 instead of the deposition-inhibiting layer composition 1.

Comparative Example B7

In Comparative Example B7, an optical film and a polarizing plate were obtained in the same manner as in Comparative Example B6, except that the core layer composition 5 was used instead of the core layer composition 1.

Comparative Example B8

In Comparative Example B8, an optical film and a polarizing plate were obtained in the same manner as in Comparative Example B1, except that a cellulose triacetate film (product name "TD80UL-M"; manufactured by Fujifilm Corporation) with a thickness of 80 μm was used instead of the untreated polyethylene terephthalate film and the cellulose triacetate film was not peeled off.

Comparative Example B9

In Comparative Example B9, an optical film and a polarizing plate were obtained in the same manner as in Comparative Example B1, except that a polyethylene terephthalate film (product name "TN100"; manufactured by Toyobo Co., Ltd.) having a thickness of 50 μm and surfaces treated with a non-silicone-based mold release agent was used instead of the cellulose triacetate film.

<Peeling Test>

A 180-degree peeling test was performed to evaluate the adhesiveness of the polarizing plates according to Examples A1 to A5 and B1 to B4 and Comparative Examples A1 to A6 and B1 to B9. Specifically, the surface of the protective or optical film in each polarizing plate was first attached to a glass plate through a double-sided bonding tape "751B" manufactured by Teraoka Seisakusho Co., Ltd., such that the periphery of the polarizing plate was exposed from the glass plate. The polarizing plate was clamped at an end exposed from the glass plate between by a chuck and pulled at an angle of 180 degrees and a speed of 300 mm/min to measure the peel strength of the interface between the adhesive and the adhesion-improving layer or optical film. The average of strength values obtained for stroke lengths (tensile lengths) from 100 mm to 200 mm was determined as the peel strength. The polarizing plate according to Comparative Example A7 was excluded from the peeling test because a base material-less protective film was not used in the polarizing plate.

<Measurement of Tensile Break Strength>

Tensile break strength was measured to evaluate the toughness of the protective films according to Examples A1 to A5 and Comparative Examples A1 to A6 and the optical films according to Examples B1 to B4 and Comparative Examples B1 to B7 and B9. Specifically, a Tensilon universal tester was used to pull a strip of each protective or optical film with a width of 25 mm and a distance between chucks of 80 mm at a test speed of 300 mm/min, in accordance with JIS K7161-1: 2014, and meanwhile measure the maximum stress applied to the protective or optical film when the protective or optical film broke, and the maximum stress was determined as the tensile break strength. For the measurement of tensile break strength, the mold release films were peeled off from the protective and optical films and the measurement was performed on the resulting simple protective and optical films. Additionally, the protective film according to Comparative Example A7 was excluded from the measurement of tensile break strength because a base material-less protective film was not used in the protective film. The arithmetic mean of three measurements was determined as the tensile break strength.

<Haze Value Measurement>

A moist heat resistance test was performed on the protective films according to Examples A1 to A5 and Comparative Examples A1 to A6 and the optical films according to Examples B1 to B4 and Comparative Examples B1 to B9, by leaving those films for 24 hours in the environment at a temperature of 80° C. and a relative humidity of 90%, and the protective and optical films were each measured for haze values (total haze values) before and after the moist heat resistance test. The haze values were determined using a haze meter (product name "HM-150"; manufactured by Murakami Color Research Laboratory Co., Ltd.) in accordance with JIS K7136: 2000. Additionally, for the optical films according to Examples B1 to B4 and Comparative Examples B1 to B9, the ratio of the haze value in each optical film after the moist heat resistance test to that before the moist heat resistance test was obtained. The heat resistance test was performed on the protective and optical films in the form of laminates with mold release films. For the haze value measurement, the mold release films were peeled off from the laminates and the resulting simple protective and optical films were measured for haze values. Additionally, the protective film according to Comparative Example A7 was excluded from the measurement of haze value because a base material-less protective film was not used in the protective film. The arithmetic mean of three measurements was determined as the haze value.

<Measurement of Ra, Rz, and Rp>

For the surfaces of the hard coat layers in the polarizing plates obtained in Examples A1 to A5 and B1 to B4 and Comparative Examples A1 to A7 and B9, and for the surface of the cellulose triacetate film in the polarizing plate obtained in Comparative Example B8, the surface profiles of measurement areas of 1 μm square and 5 μm square were each observed using an atomic force microscope (product name "WET-9400"; manufactured by Shimadzu Corporation), and the Ra, Rz, and Rp were determined from the surface profile observation data. The definitions of Ra, Rz and Rp should follow JIS B0601: 2001. Specifically, a 5 mm square was first cut at each of randomly selected three positions on each polarizing plate where no abnormalities (large foreign materials and scratches) were found at least by visual inspection, to obtain three samples. Meanwhile, a plural number of flat and circular metal plates with a diameter of 15 mm and a thickness of 1 mm were prepared and each metal plate was attached with a piece of a double-sided carbon coated tape manufactured by Nissin EM Co., Ltd. Each sample was attached to each piece of the tape such that the surface of the sample (the surface of the optical film or the polarizing film) faced upward. Then, the metal plates attached with the samples were left in a desiccator overnight to secure adhesion between the tape and the samples. After leaving overnight, each metal plate attached with a sample was fixed on the stage of an atomic force microscope (product name "WET-9400"; manufactured by Shimadzu Corporation), by means of a magnet, and the surface profiles of measurement areas of 1 μm square and 5 μm square were observed in tapping mode under the atomic force microscope. Then, the Ra, Rz, and Rp were calculated from the observation data using the surface analysis software installed in the atomic force microscope. The vertical scale during the surface analysis was 20 nm. The observation was performed at room temperature and a cantilever NCHR-20 manufactured by NanoWorld AG was used as a cantilever. In the observation of surface profile, five positions were randomly selected from each of three samples and the surface profile was observed at the 15 positions in total. The Ra, Rz, and Rp were calculated from all the obtained data of the 15 positions using the surface analysis software installed in the atomic force microscope, and the arithmetic means of the values from the 15 positions were considered as the Ra, Rz, and Rp of the respective samples.

<Measurement of Water Contact Angle (1)>

For the surfaces of the adhesion-improving layers in the saponified protective films obtained in Examples A1 to A5, the surfaces of the core layers in the saponified protective films obtained in Comparative Examples A1 to A4, the surfaces of the coat layers in the saponified protective films obtained in Comparative Examples A5 and A6, the surfaces of the saponified deposition-inhibiting layers in the optical films according to Examples B1 to B4, and the surfaces of the saponified core layers in the optical films according to Comparative Examples B1 to B3, B8, and B9, the water contact angles at 25° C. were measured using a microscopic contact angle meter (product name "CA-QI Series"; manufactured by Kyowa Interface Science Co., Ltd.) according to the sessile drop method described in JIS R3257: 1999. The arithmetic mean of three measurements was determined as the water contact angle. The polarizing plate according to Comparative Example A7 was excluded from the measurement of contact angle because a base material-less protective film was not used in the polarizing plate.

<Measurement of Water Contact Angle (2)>

For the surfaces of the hard coat layers in the polarizing plates obtained in Examples A1 to A5 and B1 to B4 and Comparative Examples A1 to A7 and B1 to B7, and B9, and the cellulose triacetate film in the polarizing plate according to Comparative Example B8, the water contact angles at 25° C. were measured using a microscopic contact angle meter (product name "CA-QI Series"; manufactured by Kyowa Interface Science Co., Ltd.) according to the sessile drop method described in JIS R3257: 1999. The arithmetic mean of three measurements was determined as the water contact angle.

<Appearance Evaluation>

The surfaces of the hard coat layers in the polarizing plates obtained in Examples A1 to A5 and Comparative Examples A1 to A7 were observed using an atomic force microscope (product name "WET-9400"; manufactured by Shimadzu Corporation) and evaluated based on the evaluation criteria as stated below:

○: with a uniform and flat surface;

×: with a relatively or completely rough surface.

<Pencil Hardness Measurement>

Pencil hardness was measured on the surfaces of the hard coat layers in the polarizing plates obtained in Examples A1 to A5 and Comparative Examples A1 to A7. Specifically, each polarizing plate was acclimated to conditions of 25° C. and 60% relative humidity for 2 hours, and the pencil hardness test specified by JIS K5600-5-4: 1999 was then performed on the surface of the hard coat layer in the resulting polarizing plate, using the testing pencils specified by JIS S6006. In the pencil hardness test, a load of 750 g was applied to a pencil and the pencil was moved at a speed of 1 mm/sec. The grade of the hardest pencil that did not scratch the surface of the hard coat layer during the pencil hardness test was determined as the pencil hardness. A plural number of pencils with different hardness were used for the measurement of pencil hardness and the pencil hardness test was repeated five times on each pencil. In cases where no scratch was visibly detected on the surface of the polarizing plate in four or more out of the five replicates when the surface of the polarizing plate was observed under transmitting fluorescent light, the pencil with the hardness was determined to make no scratch on the surface of the polarizing plate.

The results are shown in Tables 1 to 4 below.

TABLE 1

| | Peel strength (N) | Tensile break strength (N/mm²) | Haze value (%) Before moist heat resistance test | Haze value (%) After moist heat resistance test | Water contact angle (°) (1) | Water contact angle (°) (2) | Pencil hardness |
|---|---|---|---|---|---|---|---|
| Example A1 | 12 | 45 | 0.1 | 0.2 | 51 | 48 | 3H |
| Example A2 | 10 | 44 | 0.1 | 0.3 | 51 | 49 | 3H |
| Example A3 | 11 | 45 | 0.1 | 0.2 | 51 | 50 | 3H |
| Example A4 | 12 | 45 | 0.1 | 0.3 | 51 | 50 | 3H |
| Example A5 | 11 | 45 | 0.1 | 0.2 | 51 | 49 | 3H |
| Comparative Example A1 | 0.1 or less | 43 | 0.1 | 4.5 | 83 | 49 | 3H |
| Comparative Example A2 | 0.1 or less | 45 | 0.1 | 5.0 | 82 | 49 | 2H |
| Comparative Example A3 | 0.1 or less | 44 | 0.1 | 4.5 | 85 | 49 | 2H |
| Comparative Example A4 | 4 | 10 | 0.1 | 0.5 | 85 | 49 | H |
| Comparative Example A5 | undetectable | 41 | 0.1 | 6.0 | 51 | 49 | 3H |
| Comparative Example A6 | 0.1 or less | 40 | 0.1 | 0.1 | 85 | 49 | 3H |
| Comparative Example A7 | — | — | — | — | — | 85 | 2H |

TABLE 2

| | 1 μm square Ra (nm) | 1 μm square Rz (nm) | 1 μm square Rp (nm) | 5 μm square Ra (nm) | 5 μm square Rz (nm) | 5 μm square Rp (nm) | Appearance evaluation |
|---|---|---|---|---|---|---|---|
| Example A1 | 0.785 | 9.820 | 5.879 | 0.813 | 13.456 | 9.165 | ○ |
| Example A2 | 0.729 | 9.773 | 5.851 | 0.841 | 13.667 | 9.044 | ○ |
| Example A3 | 0.714 | 9.467 | 5.156 | 0.857 | 13.858 | 9.223 | ○ |
| Example A4 | 0.702 | 9.698 | 5.696 | 0.890 | 13.012 | 9.397 | ○ |
| Example A5 | 0.765 | 9.114 | 5.378 | 0.836 | 13.224 | 9.390 | ○ |
| Comparative Example A1 | 0.734 | 9.801 | 5.123 | 0.846 | 13.643 | 9.224 | ○ |
| Comparative Example A2 | 0.722 | 9.541 | 5.871 | 0.825 | 13.840 | 9.119 | ○ |
| Comparative Example A3 | 0.708 | 9.849 | 5.471 | 0.855 | 13.842 | 9.117 | ○ |
| Comparative Example A4 | 0.727 | 9.642 | 5.368 | 0.892 | 13.548 | 9.243 | ○ |
| Comparative Example A5 | 0.737 | 9.624 | 5.587 | 0.864 | 13.112 | 9.443 | ○ |
| Comparative Example A6 | 0.716 | 9.846 | 5.333 | 0.864 | 13.555 | 9.321 | ○ |
| Comparative Example A7 | 1.707 | 11.951 | 6.813 | 0.924 | 12.368 | 8.534 | × |

TABLE 3

| | Haze value (%) Before moist heat resistance test | Haze value (%) After moist heat resistance test | After the test/Before the test | Tensile break strength (N/mm²) | Peel strength (N) |
|---|---|---|---|---|---|
| Example B1 | 0.1 | 0.2 | 2 | 45 | 12 |
| Example B2 | 0.1 | 0.3 | 3 | 44 | 10 |
| Example B3 | 0.1 | 0.2 | 2 | 48 | 11 |
| Example B4 | 0.1 | 0.3 | 3 | 43 | 12 |
| Comparative Example B1 | 0.1 | 4.5 | 45 | 44 | 0.1 or less |
| Comparative Example B2 | 0.1 | 5.0 | 50 | 46 | 0.1 or less |
| Comparative Example B3 | 0.1 | 0.7 | 4 | 13 | 4 |
| Comparative Example B4 | 0.1 | 5.0 | 50 | 44 | 0.3 |
| Comparative Example B5 | 0.1 | 5.1 | 51 | 47 | 0.3 |
| Comparative Example B6 | 0.1 | 6.2 | 62 | 40 | 0.2 |
| Comparative Example B7 | 0.1 | 6.1 | 61 | 41 | 0.2 |

TABLE 3-continued

| | Haze value (%) | | | | |
|---|---|---|---|---|---|
| | Before moist heat resistance test | After moist heat resistance test | After the test/Before the test | Tensile break strength (N/mm$^2$) | Peel strength (N) |
| Comparative Example B8 | 0.1 | 4.7 | 47 | — | 0.1 or less |
| Comparative Example B9 | 0.1 | 4.6 | 46 | 43 | 0.1 or less |

TABLE 4

| | 1 μm square | | | 5 μm square | | | Water contact angle (°) | |
|---|---|---|---|---|---|---|---|---|
| | Ra (nm) | Rz (nm) | Rp (nm) | Ra (nm) | Rz (nm) | Rp (nm) | (1) | (2) |
| Example B1 | 0.785 | 9.820 | 5.879 | 0.813 | 13.456 | 9.165 | 51 | 49 |
| Example B2 | 0.784 | 9.810 | 5.812 | 0.802 | 13.220 | 9.154 | 52 | 48 |
| Example B3 | 0.799 | 9.799 | 5.854 | 0.820 | 13.141 | 9.203 | 52 | 50 |
| Example B4 | 0.785 | 9.820 | 5.879 | 0.812 | 13.600 | 9.271 | 51 | 49 |
| Comparative Example B1 | — | — | — | — | — | — | 84 | 49 |
| Comparative Example B2 | — | — | — | — | — | — | 83 | 50 |
| Comparative Example B3 | — | — | — | — | — | — | 70 | 47 |
| Comparative Example B4 | — | — | — | — | — | — | — | 52 |
| Comparative Example B5 | — | — | — | — | — | — | — | 50 |
| Comparative Example B6 | — | — | — | — | — | — | — | 50 |
| Comparative Example B7 | — | — | — | — | — | — | — | 51 |
| Comparative Example B8 | 1.707 | 11.951 | 6.813 | 0.924 | 12.368 | 8.534 | 86 | 92 |
| Comparative Example B9 | 2.780 | 20.365 | 9.414 | 3.598 | 90.225 | 46.140 | 87 | 93 |

As shown in Table 1, in the polarizing plates according to Comparative Examples A1 to A3, and A5, the adhesion between each protective film and the adhesive was poor, and thus the protective films and the polarizers easily peeled. Additionally, peel strength was not measured on the polarizing plate according to Comparative Example A4 because the polarizing plate easily peeled at the interface between the coat layer and the core layer. In contrast, in the polarizing plates according to Examples A1 to A5, the adhesion between each protective film and the adhesive was good, and thus the protective films and the polarizers did not peel. The results indicate that adhesion to the adhesive was enhanced by forming an adhesion-improving layer on each core layer.

Additionally, the protective film according to Comparative Example A4 had an extremely hard core layer and thus a low tensile break strength. In contrast, the protective films according to Examples A1 to A5 had the core layers distinct from the adhesion-improving layers and thus no extremely hard core layers, which caused the tensile break strengths to be high. The results indicate that the protective films with excellent toughness were obtained by forming an adhesion-improving layer on each core layer.

In addition, the protective films according to Examples A1 to A5 had low haze values after the moist heat resistance test, as compared to those of the protective films according to Comparative Examples A1 to A3, and A5. This is considered to be due to the inhibition of deposition of the ultraviolet absorber by the adhesion-improving layer prepared on each core layer in the protective films according to Examples A1 to A5, in contrast to the protective films according to Comparative Examples A1 to A3, and A5, in which the moist heat resistance test caused the ultraviolet absorber dispersed in the core layers to deposit on the surfaces of the core or coat layers. When the substances deposited on the surfaces of the protective films according to Comparative Examples A1 to A3, and A5 were collected and analyzed by infrared spectroscopy, the deposited substances were found to be the ultraviolet absorber.

As shown in Table 3, in the optical films according to Comparative Example B1, B2, and B4 to B9, the ratios of the haze values in the optical films after the moist heat resistance test to those before the moist heat resistance test were more than 10. This is considered to be due to deposition of the ultraviolet absorbers dispersed in the core layers onto the surfaces of the core or coat layers, which was caused by the moist heat resistance test. When the substances deposited on the surfaces of the core or coat layers in the optical films according to Comparative Example B1, B2, and B4 to B9 were collected and analyzed by infrared spectroscopy, the substances were found to be the ultraviolet absorbers. In contrast in the optical films according to Examples B1 to B4, the deposition-inhibiting layers were formed on the core layers, and thus the ratios of the haze values in the optical films after the moist heat resistance test to those before the moist heat resistance test were 10 or less. The results indicate that the deposition-inhibiting layers formed on the core layers were able to inhibit deposition of the ultraviolet absorbers.

Additionally, the optical film according to Comparative Example B3 had an extremely hard core layer and thus a tensile break strength of less than 30 N/mm$^2$. In contrast, the optical films according to Examples B1 to B4 had the core layers distinct from the deposition-inhibiting layers and thus no extremely hard core layers, which caused the tensile break strengths to be 30 N/mm$^2$ or more. These results indicate that the optical films with excellent toughness were obtained by forming a deposition-inhibiting layer on each core layer.

In addition, the polarizing plates according to Comparative Examples B1, B2, and B4 to B9 had low peel strengths and poor adhesion to the adhesive because the ultraviolet absorbers were deposited on the surfaces of the core or coat layers in the optical films. In contrast, the polarizing plates according to Examples B1 to B4 had high peel strengths and excellent adhesion to the adhesive because the deposition-inhibiting layers inhibited deposition of the ultraviolet absorbers.

The polyvinyl alcohol adhesive is used as an adhesive in the above Examples, while results similar to those in the above Examples were obtained even in cases where an ultraviolet curable adhesive was used as an adhesive.

LIST OF REFERENCE NUMERALS 10, 110. Laminate
20. Protective film
20A, 20B, 120A, 120B. Surface
21, 121. Core layer
22. Adhesion-improving layer
23, 123. Light-transmitting functional layer
30, 130. Mold release film
40, 140. Polarizing plate
41, 141. Polarizer
44, 144. Protective film
50, 150. Image display device
60. Display panel
61. Display element
70. Touch panel
120. Optical film
122. Deposition-inhibiting layer

The invention claimed is:

1. A base material-less protective film used in a polarizing plate, comprising:
   a core layer containing a resin made of a cured product of an ionizing radiation-polymerizable compound; and
   an adhesion-improving layer provided on one surface of the core layer,
   wherein the adhesion-improving layer is a cured product of a curable composition comprising an ionizing radiation-polymerizable compound,
   wherein a surface of the adhesion-improving layer defines one surface of the protective film,
   wherein a thickness of the adhesion-improving layer is 100 nm or more and less than 800 nm,
   wherein a thickness of the protective film is less than 40 μm, and
   wherein a tensile break strength of the protective film is 30 N/mm² or more.

2. The protective film according to claim 1, wherein the contact angle of water on the surface of the adhesion-improving layer after saponification is 80° or less.

3. The protective film according to claim 1, wherein the adhesion-improving layer further includes a silane coupling agent having a reactive functional group and a hydrolyzable group(s).

4. The protective film according to claim 1, wherein the ionizing radiation-polymerizable compound of the adhesion-improving layer is a polyfunctional ionizing radiation-polymerizable compound.

5. The protective film according to claim 3, wherein the reactive functional group is an ionizing radiation-polymerizable functional group.

6. The protective film according to claim 1, further comprising a light-transmitting functional layer provided on the other surface of the core layer, which is opposite to the one surface of the core layer.

7. A laminate comprising:
   the protective film according to claim 1; and
   a mold release film provided on the other surface of the protective film, which is opposite to the one surface of the protective film.

8. A polarizing plate comprising:
   the protective film according to claim 1; and
   a polarizer bonded to the adhesion-improving layer of the protective film through an adhesive.

9. An image display device comprising a display panel, wherein the display panel comprises a display element and the protective film according to claim 1 or the polarizing plate according to claim 8 placed on the observer's side of the display element.

10. A method of producing the polarizing plate, the method comprising the steps of:
    bonding together the laminate according to claim 7 and a polarizer through an adhesive, such that the adhesive is in contact with the adhesion-improving layer of the laminate; and
    peeling off the mold release film from the laminate after bonding of the laminate to the polarizer.

11. The method of producing the polarizing plate according to claim 10, further comprising the step of saponifying the laminate before bonding of the laminate to the polarizer.

12. A base material-less optical film comprising:
    a core layer containing a binder resin made of a cured product and an ultraviolet absorber dispersed in the binder resin; and
    a deposition-inhibiting layer provided on one surface of the core layer and inhibiting deposition of the ultraviolet absorber,
    wherein the thickness of the optical film is less than 40 μm,
    the tensile break strength of the optical film is 30 N/mm² or more, and
    the optical film has a haze value of less than 1% after 24 hours of exposure to an environment having a temperature of 80° C. and a relative humidity of 90%.

13. The optical film according to claim 12, wherein the deposition-inhibiting layer contains a resin made of a cured product of a polyfunctional ionizing radiation-polymerizable compound.

14. The optical film according to claim 13, wherein the deposition-inhibiting layer further contains a silane coupling agent.

15. The optical film according to claim 12, further comprising a light-transmitting functional layer provided on the other surface of the core layer, which is opposite to the one surface of the core layer.

16. A laminate comprising:
    the optical film according to claim 12; and
    a mold release film provided on a surface of the optical film opposite to the surface on the side of the deposition-inhibiting layer.

17. A polarizing plate comprising:
    the optical film according to claim 12; and
    a polarizer bonded to the deposition-inhibiting layer of the optical film through an adhesive.

18. An image display device comprising a display panel, wherein the display panel comprises a display element and the optical film according to claim 12 or the polarizing plate according to claim 17 placed on the observer's side of the display element.

19. A method of producing the polarizing plate, comprising the steps of:

bonding together the laminate according to claim 16 and a polarizer through an adhesive, such that the adhesive is in contact with the deposition-inhibiting layer of the laminate; and peeling off the mold release film after bonding of the laminate to the polarizer.

20. The method of producing the polarizing plate according to claim 19, further comprising the step of saponifying the laminate before bonding of the laminate to the polarizer.

* * * * *